United States Patent
Sahara et al.

(10) Patent No.: US 7,671,495 B2
(45) Date of Patent: Mar. 2, 2010

(54) ARMATURE AND MOTOR

(75) Inventors: Yoshimichi Sahara, Toyohashi (JP); Kazuyuki Izumi, Iwata (JP); Yoshihiro Mashima, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 132 days.

(21) Appl. No.: 11/976,218

(22) Filed: Oct. 23, 2007

(65) Prior Publication Data

US 2008/0116755 A1    May 22, 2008

(30) Foreign Application Priority Data

Nov. 20, 2006   (JP) .............................. 2006-313081
Jan. 9, 2007    (JP) .............................. 2007-001234
Jul. 17, 2007   (JP) .............................. 2007-185559

(51) Int. Cl.
  *H02K 3/52* (2006.01)
  *H02K 3/18* (2006.01)
(52) U.S. Cl. ............................ 310/71; 310/198; 310/180
(58) Field of Classification Search ................ 310/179, 310/180, 71, 184, 216, 218, 194, 197
See application file for complete search history.

(56) References Cited

U.S. PATENT DOCUMENTS

| | | | | |
|---|---|---|---|---|
| 4,577,139 A | * | 3/1986 | Reinhardt et al. ...... | 318/400.41 |
| 5,173,628 A | * | 12/1992 | Yoshida et al. ................ | 310/71 |
| 5,268,604 A | * | 12/1993 | Katakura ...................... | 310/71 |
| 5,519,271 A | * | 5/1996 | Sakashita et al. .............. | 310/71 |
| 6,472,783 B1 | | 10/2002 | Witthohn et al. | |
| 6,831,386 B2 | * | 12/2004 | Miya et al. .................... | 310/91 |
| 2006/0103247 A1 | * | 5/2006 | Kotajima ...................... | 310/71 |
| 2006/0208605 A1 | | 9/2006 | Aoyama et al. | |

FOREIGN PATENT DOCUMENTS

| | | | | |
|---|---|---|---|---|
| JP | 4-178162 | | * | 6/1992 |
| JP | 06225488 | A | * | 8/1994 |
| JP | 06343236 | A | * | 12/1994 |
| JP | 2000201443 | A | * | 7/2000 |
| JP | A-2003-309942 | | | 10/2003 |

OTHER PUBLICATIONS

Yeadon et al. "Handbook of Small Electric Motors", McGraw-Hill, pp. 5.4-5.11, 2000.*

* cited by examiner

*Primary Examiner*—Burton Mullins
(74) *Attorney, Agent, or Firm*—Posz Law Group, PLC

(57) ABSTRACT

In an armature of a motor, each of windings is wound around at least two of a plurality of tooth portions of a core to form at least two wound parts of the winding. A crossover of each winding, which connects between corresponding two of the at least two wound parts, is placed on one axial side of a ring portion of the core. A crossover relief space is axially recessed in an end surface of the ring portion on the one axial side. At least a portion of each crossover is received in the crossover relief space. Guides project on the other axial side of the core and guide winding terminal portions of the windings.

9 Claims, 30 Drawing Sheets

US 7,671,495 B2

ARMATURE AND MOTOR

CROSS REFERENCE TO RELATED APPLICATION

This application is based on and incorporates herein by reference Japanese Patent Application No. 2006-313081 filed on Nov. 20, 2006, Japanese Patent Application No. 2007-1234 filed on Jan. 9, 2007 and Japanese Patent Application No. 2007-185559 filed on Jul. 17, 2007.

BACKGROUND OF THE INVENTION

1. Field of the Invention

The present invention relates to an armature and a motor.

2. Description of Related Art

Japanese Unexamined Patent Publication No. 2006-271188 (corresponding to US2006/0208605A1) discloses an armature of a motor. The armature has windings, which are wound around tooth portions of a core and form crossovers. The crossover of each winding connects between corresponding wound parts (coils) of the winding that are wound around the corresponding tooth portions.

In the armature of Japanese Unexamined Patent Publication No. 2006-271188, the crossovers overlap or cross one after another in the axial direction of the core. Thus, the axial size of the armature is disadvantageously increased. Particularly, for example, a fan motor, which cools a radiator of a vehicle, such as a passenger automobile, is normally provided to a location that is adjacent to the radiator in an engine room of the vehicle. Thus, it is desirable to reduce the axial size of the entire motor. In view of this, the axial size of the armature of the fan motor should be reduced to meet such a demand.

Japanese Unexamined Patent Publication No. 2003-309942 discloses another armature of an electric motor. In this armature, linear crossover guide grooves are formed in an axial end surface of a dielectric insulation cover installed at one axial end of a core of the armature. Each of the linear crossover guide grooves extends from one point at an outer peripheral surface of the insulation cover to another point at the outer peripheral surface of the insulation cover near another tooth portion to receive a crossover of the corresponding winding. At the time of winding the windings around tooth portions of the core, the crossovers are effectively guided along the guide grooves. Therefore, accurate positioning of the crossovers on the core is possible at the time of winding the windings. However, in this instance, the precise positioning of the crossovers along the guide grooves is required, so that a high precision winding machine is required. Also, when the number of crossovers of the windings is increased, the crossovers, which are axially overlapped, may axially protrude, thereby increasing the axial size of the armature core.

In addition, in a brushless motor, a control circuit device, which supplies electric current, switches supply of the electric current to windings, so that circuit power supply portions of the circuit device need to be electrically connected to the windings. In a case where the circuit device and the brushless motor are integrated together, an intermediate terminal is provided between the circuit power supply portion of the circuit device and the winding to electrically connect therebetween (see, for example, Japanese Unexamined Patent Publication No. 2001-527376 corresponding to U.S. Pat. No. 6,472,783B1).

However, when the intermediate terminal is provided between the circuit power supply portion of the circuit device and the winding, costs may be disadvantageously increased. Thus, there is a need for reducing or minimizing the costs while implementing effective connections between the circuit power supply portion of the circuit device and the winding.

SUMMARY OF THE INVENTION

The present invention is made in view of the above disadvantages. Thus, it is an objective of the present invention to provide an armature and a motor, which enable a reduction in an axial size thereof while allowing a relatively easy winding operation of windings around a core.

It is another objective of the present invention to provide a motor that can reduce or minimize costs while implementing effective connections between circuit power supply portions of a circuit device and windings.

To achieve the objectives of the present invention, there is provided an armature, which includes a core and a plurality of windings. The core includes a ring portion and a plurality of tooth portions. Each of the plurality of tooth portions extends radially outward from an outer peripheral part of the ring portion. A plurality of slots is defined such that each slot is formed between corresponding adjacent two of the plurality of tooth portions. Each of the plurality of windings is wound around at least two of the plurality of tooth portions to form at least two wound parts of the winding. A crossover of each winding, which connects between corresponding two of the at least two wound parts, is placed on one axial side of the ring portion. A crossover relief space is axially recessed in an end surface of the ring portion on the one axial side of the ring portion at a location radially inward of an outer peripheral surface of the ring portion. At least a portion of each crossover is received in the crossover relief space.

To achieve the objectives of the present invention, there is also provided a motor, which includes the above armature, a rotor and a fan. The rotor is rotatably placed radially outward of the armature. The fan is connected to the rotor to rotate integrally with the rotor.

To achieve the objectives of the present invention, there is also provided a motor, which includes an armature, a plurality of guides, and at least one circuit power supply portion. The armature includes a core, a dielectric insulator and a plurality of windings. The core includes a plurality of tooth portions. The dielectric insulator is provided to the core. The windings are wound around the plurality of tooth portions of the core over the insulator. The guides project from the insulator on one axial side of the armature in the axial direction of the armature and guide winding terminal portions of the plurality of windings, which project from the core. At least one circuit power supply portion is located on the one axial side of the armature and electrically connects between the winding terminal portions of the plurality of windings to a circuit device, which supplies electric current to the plurality of windings.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A structure of an armature 10 according to a first embodiment of the present invention will be described.

Figure 1:
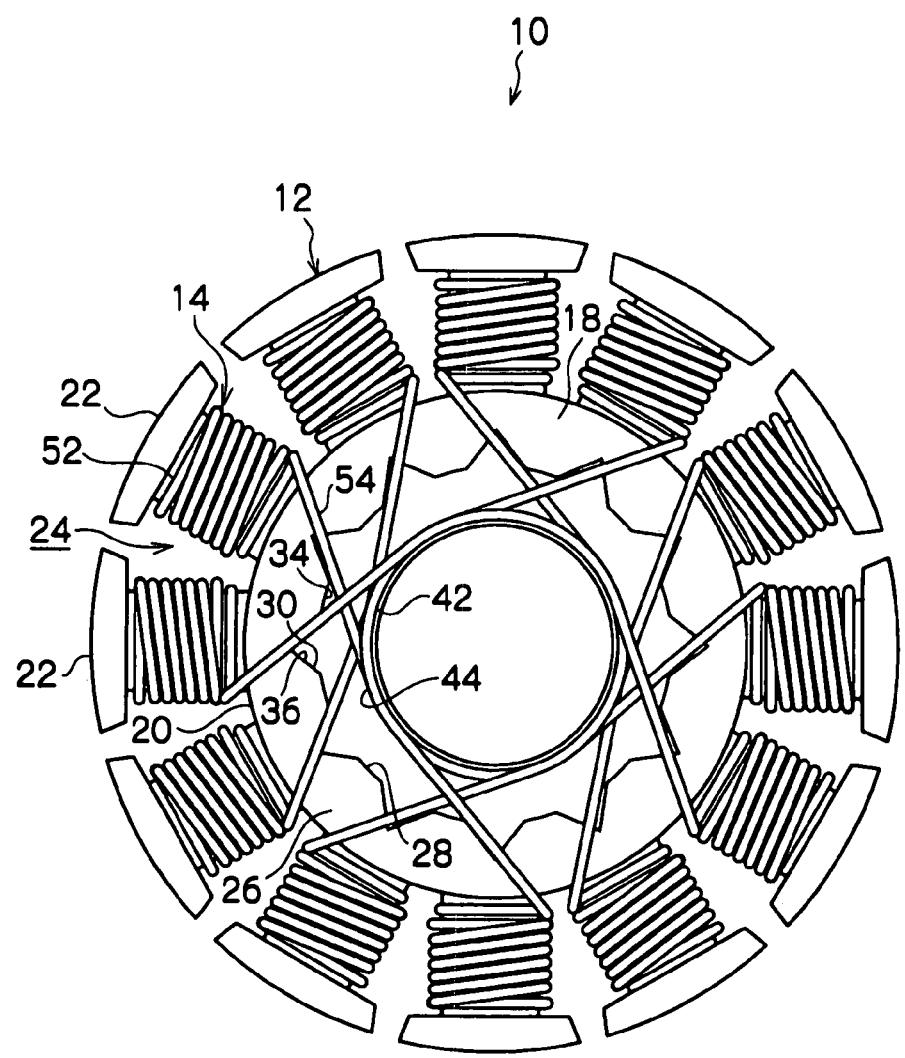
FIG. 1 is a plan view of an armature according to a first embodiment of the present invention.
Figure 2:
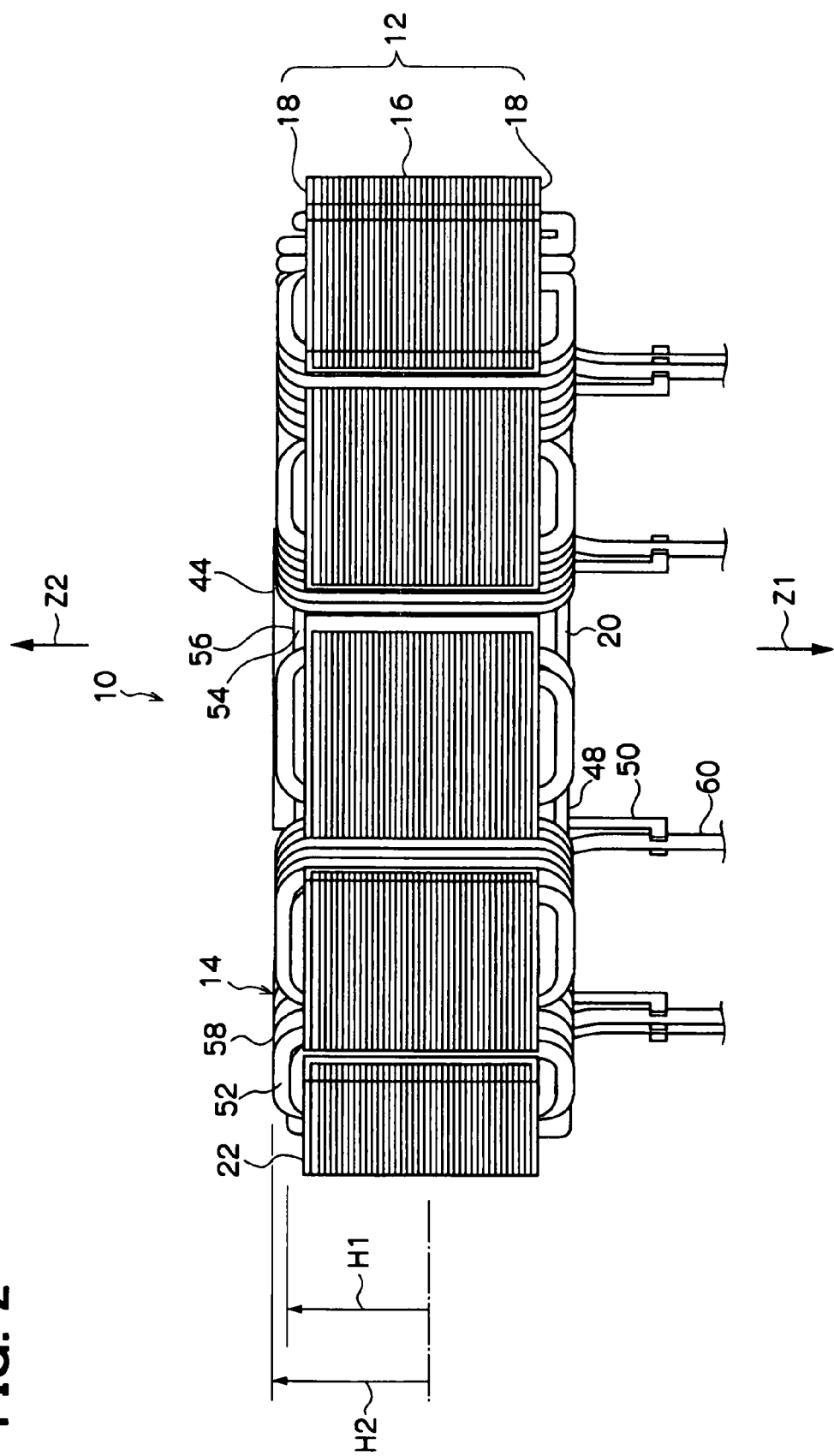
FIG. 2 is a side view of the armature according to the first embodiment.
Figure 3:
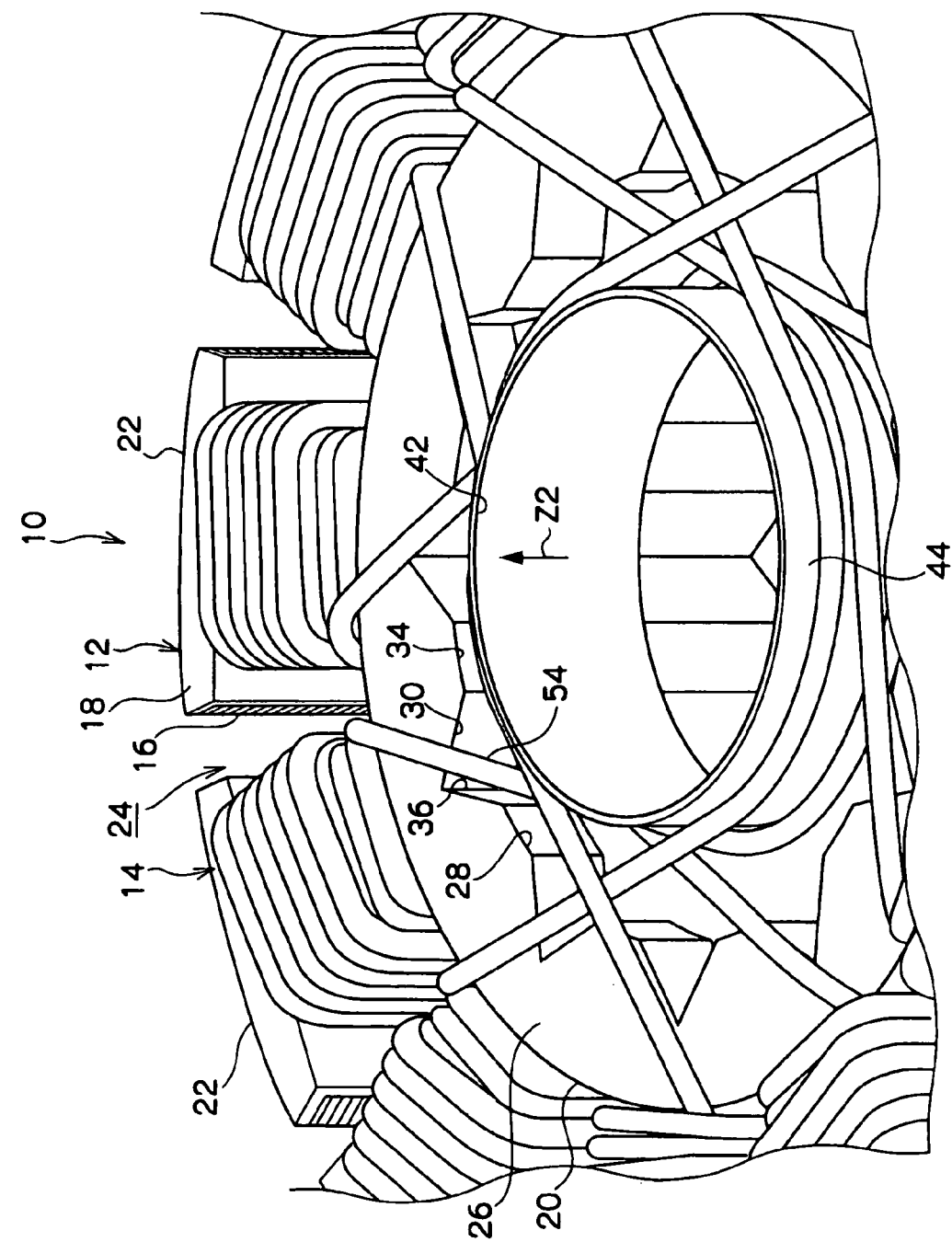
FIG. 3 is an enlarged partial perspective view of the armature seen from one axial side according to the first embodiment.
Figure 4:
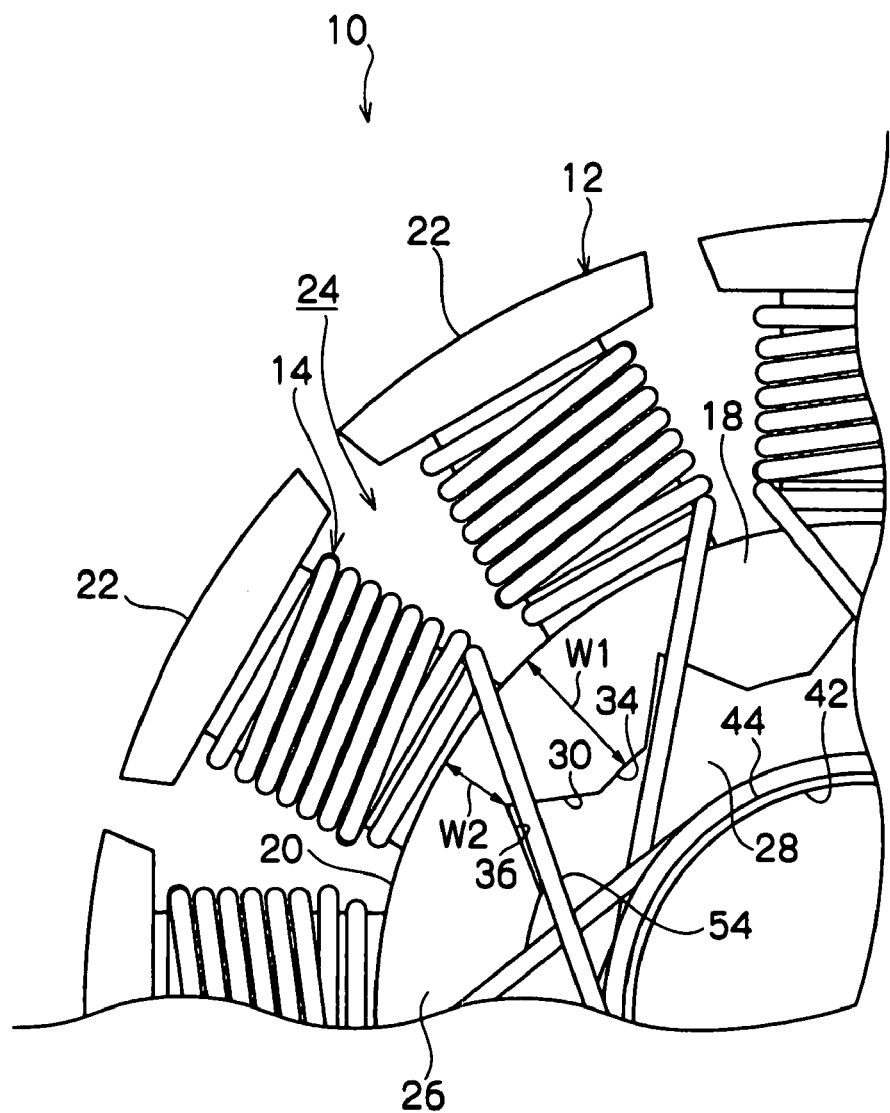
FIG. 4 is an enlarged partial plan view of the armature of the first embodiment.
Figure 5:
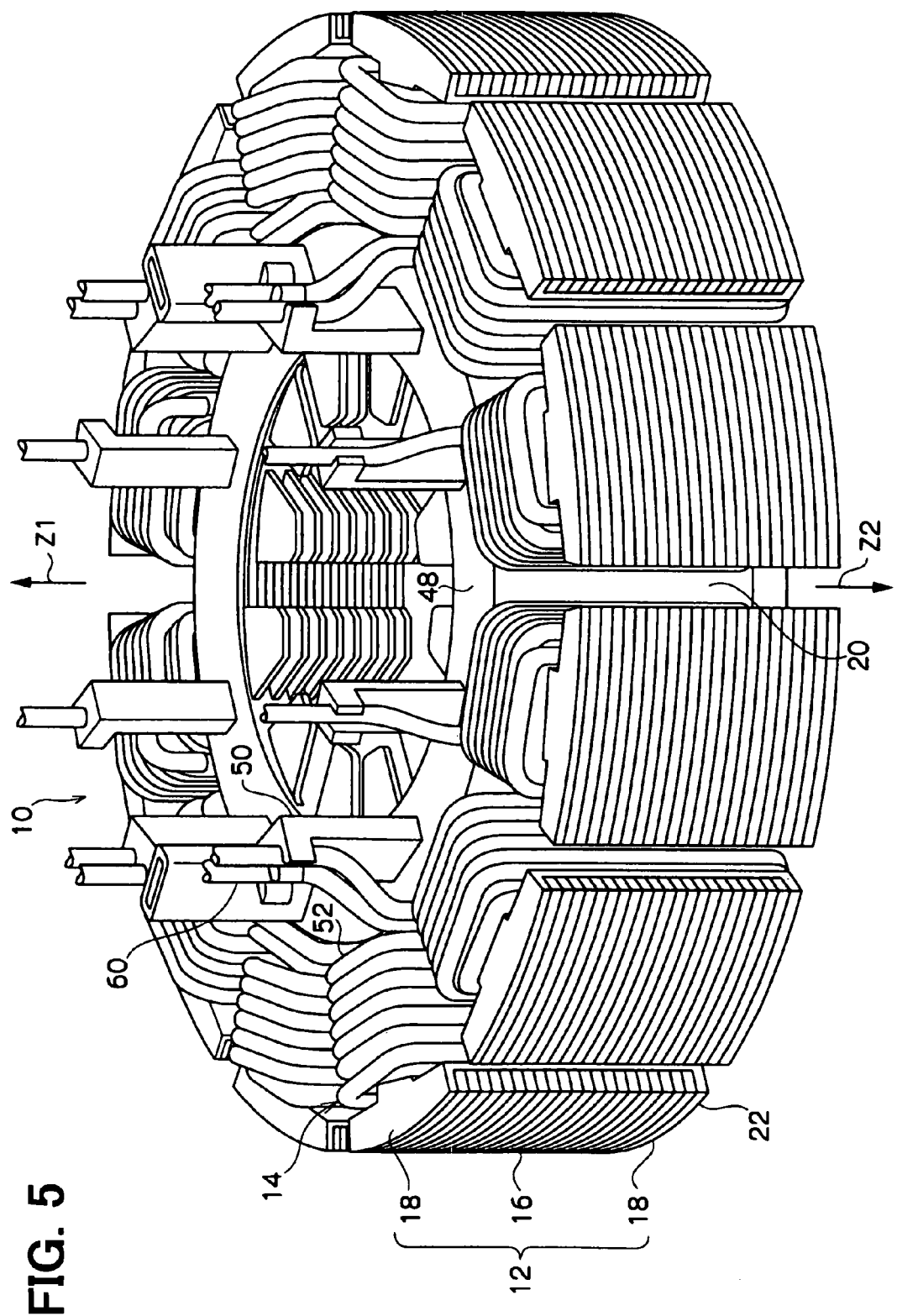
FIG. 5 is an enlarged perspective view of the armature seen from the other axial side according to the first embodiment.

FIGS. 1 to 5 show the structure of the armature 10 according to the first embodiment of the present invention. FIG. 1 is a plan view of the armature 10. FIG. 2 is a side view of the armature 10. FIG. 3 is an enlarged partial perspective view of the armature 10 seen from a second axial side (Z2 side). FIG. 4 is an enlarged partial plan view of the armature 10. FIG. 5 is a perspective view of the armature 10 seen from a first axial side (Z1 side).

The armature 10 according to the first embodiment of the present invention shown in the above-described drawings is used in, for example, a fan motor 70. The armature 10 includes a stator core 12 and a plurality of windings 14.

As shown in FIG. 2, the stator core 12 includes a laminated core 16 and two dielectric insulators 18. The laminated core 16 includes a plurality of core sheets (thin iron plates), which are axially stacked one after another and are fixed together by, for example, staking or caulking. The insulators 18 are made of synthetic resin and are axially installed to the laminated core 16 from opposite sides, respectively. Here, it should be noted that the insulators 18 may also be collectively referred to as an insulator or an insulator arrangement. As shown in FIG. 1, the stator core 12, which includes the laminated core 16 and the insulators 18, has a ring portion 20. A plurality of T-shaped tooth portions 22 extends radially outwardly from an outer peripheral part of the ring portion 20. A V-shaped slot 24 is provided between each adjacent two of the tooth portions 22.

A crossover relief space 28, which receives crossovers 54 of the windings 14 described below, is axially recessed in one axial end surface 26 of the ring portion 20 (one axial end surface of the insulator 18) at a location radially inward of an outer peripheral surface of the ring portion 20. The crossover relief space 28 is formed in the laminated core 16 and the insulator 18 of the stator core 12. The crossover relief space 28 is formed as an annular groove (or an arcuate groove), which extends in a circumferential direction of the ring portion 20. The crossover relief space 28 includes a plurality of V-shaped sections (radial recesses) 30, each of which is located radially inward of a corresponding one of the tooth portions 22 and is radially outwardly recessed from an inner peripheral surface of the ring portion 20 while being tapered from a radially inner side of the ring portion 20 toward a radially outer side of the ring portion 20, i.e., toward the corresponding tooth portion 22. In the first embodiment, the number of the V-shaped sections 30 is the same as the number of the tooth portions 22 and is twelve in this particular instance.

As shown in FIG. 4, due to the provision of the V-shaped sections 30 in the crossover relief space 28, each slot side groove section (also referred to as "slot side section") 34, which is located radially inward of the corresponding slot 24, has a smaller radial groove width, which is radially measured from an inner peripheral surface of the slot side groove section 34 to an outer peripheral surface of a cylindrical guide wall (or a tubular guide wall) 44 described below, in comparison to that of each tooth side groove section (also referred to "tooth side section") 36, which is located radially inward of the corresponding tooth portion 22.

In other words, in the ring portion 20 of the stator core 12, each slot side section of the ring portion 20, which is located radially inward of the corresponding slot 24, has a larger width from the outer peripheral surface of the ring portion 20 in comparison to each tooth side section of the ring portion 20, which is located radially inward of the corresponding tooth portion 22. Specifically, in this example, the width from the outer peripheral surface of the ring portion 20 to the crossover relief space 28 is set to be a width W1 at each slot side section of the ring portion 20 located radially inward of the corresponding slot 24 and is set to be a width W2, which is smaller than the width W1, at each tooth side section of the ring portion 20 located radially inward of the corresponding tooth portion 22.

Furthermore, as shown in FIG. 1, a through hole 42 axially extends through the center of the ring portion 20. The cylindrical guide wall 44, which is formed integrally in the one of the insulators 18 (specifically, the insulator 18 at the Z2 side), is provided along a peripheral edge of the through hole 42 in the ring portion 20. In other words, the guide wall 44 axially protrudes in the core 12 around the through hole 42 on the second axial side (Z2 side) of the ring portion 20 such that the guide wall 44 is radially inwardly spaced from the inner peripheral surface of the ring portion 20 to radially define the crossover relief space 28 all around the guide wall 44 between the outer peripheral surface of the guide wall 44 and the inner peripheral surface of the ring portion 20. Furthermore, the guide wall 44 may axially outwardly protrude from the end surface 26 of the ring portion 20 on the second axial side (Z2 side) of the ring portion 20, if desired.

In the stator core 12, as shown in FIGS. 2 and 5, guides (winding holders) 50 are provided in an end surface 48 of the ring portion 20 on the first axial side of the ring portion 20 and is formed integrally with the other one of the insulators 18 (i.e., the insulator 18 at the Z1 side). The guides 50 axially protrude from the end surface 48 of the ring portion 20 on the first axial side (Z1 side).

As shown in FIG. 1, each winding 14 is wound several times around one of the tooth portions 22 and is thereafter wound several times around another one of the tooth portions 22, which is circumferentially spaced from the one of the tooth portions 22 by several of the tooth portions 22. Each wound part of the winding 14, which is wound around the corresponding tooth portion 22, is formed as a wound part (coil) 52. When the winding 14 is wound around the tooth portions 22 in the above described manner, each crossover 54 is formed between the corresponding two wound parts 52.

As shown in FIGS. 1 and 3, each crossover 54 extends over the second axial side of the ring portion 20 and is guided, i.e., is held along the outer peripheral surface of the guide wall 44. At this time, the crossovers 54 are overlapped in the axial direction of the ring portion 20. Furthermore, a portion of each crossover 54, which extends over the crossover relief space 28, is urged into the crossover relief space 28 in the axial direction on the one side (Z2 side in FIG. 3) by an undepicted urging member (e.g., a flier), so that the portion of the crossover 54 is axially received into the crossover relief space 28.

In this way, as shown in FIG. 2, an axially outermost part 56 of all the crossovers 54 is placed axially inward of an outermost part 58 of all the wound parts 52. That is, in the first embodiment, a height (an axial height measured from an axial center of the ring portion 20) of the outermost part 56 of the crossovers 54 is set to be a height H1, which is lower (smaller) than a height (an axial height measured from the axial center of the ring portion 20) H2 of the outermost part 58 of the wound parts 52.

Furthermore, as shown in FIGS. 2 and 5, winding terminal portions 60 of each winding 14 are placed on the first axial side (Z1 side) of the ring portion 20, which is opposite from the crossovers 54. The winding terminal portions 60 are held by the guides 50, which axially protrude from the surface of the insulator 18 of the stator core 12 on the first axial side (Z1 side).

Next, the structure of the fan motor 70, which has the armature 10 of the first embodiment, will be described.

Figure 6:
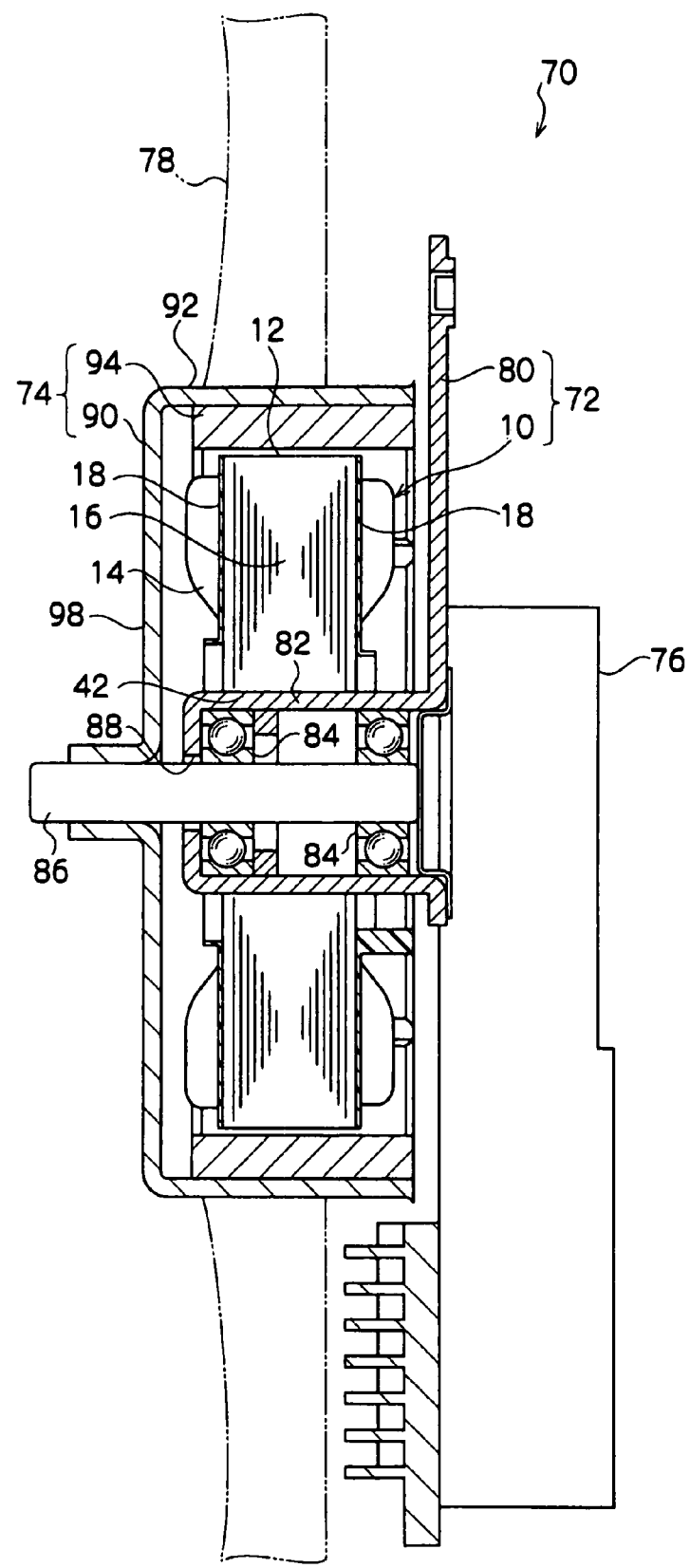
FIG. 6 is an axial cross sectional view of a fan motor according to the first embodiment.

The fan motor 70 of the first embodiment shown in FIG. 6 is for cooling a radiator of a vehicle and is placed adjacent to the radiator in an engine room of the vehicle. The fan motor 70 includes a stator 72, a rotor 74, a control circuit device 76 and a fan 78.

The stator 72 includes a disk-shaped stator housing 80 in addition to the armature 10 described above. The stator housing 80 includes a generally planar main body support and a tubular portion 82. The tubular portion 82 is provided in the center of the stator housing 80. When the tubular portion 82 of the stator housing 80 is fitted into the through hole 42 of the armature 10, the stator housing 80 is assembled with the armature 10.

Two bearing members 84 are received in the tubular portion 82 and rotatably support a rotatable shaft 86. One axial end of the rotatable shaft 86 protrudes outward from the tubular portion 82 through a hole 88, which is formed in a bottom portion of the tubular portion 82. The one axial end of the rotatable shaft 86 is fixed to a center of a rotor housing 90, which is provided in the rotor 74.

The rotor 74 includes the rotor housing 90 that is cup-shaped. Permanent magnets 94 are fixed to an inner peripheral surface of a cylindrical tubular portion 92 of the rotor housing 90. The magnets 94 are radially opposed to the stator core 12, which is provided to the armature 10.

Figure 7:
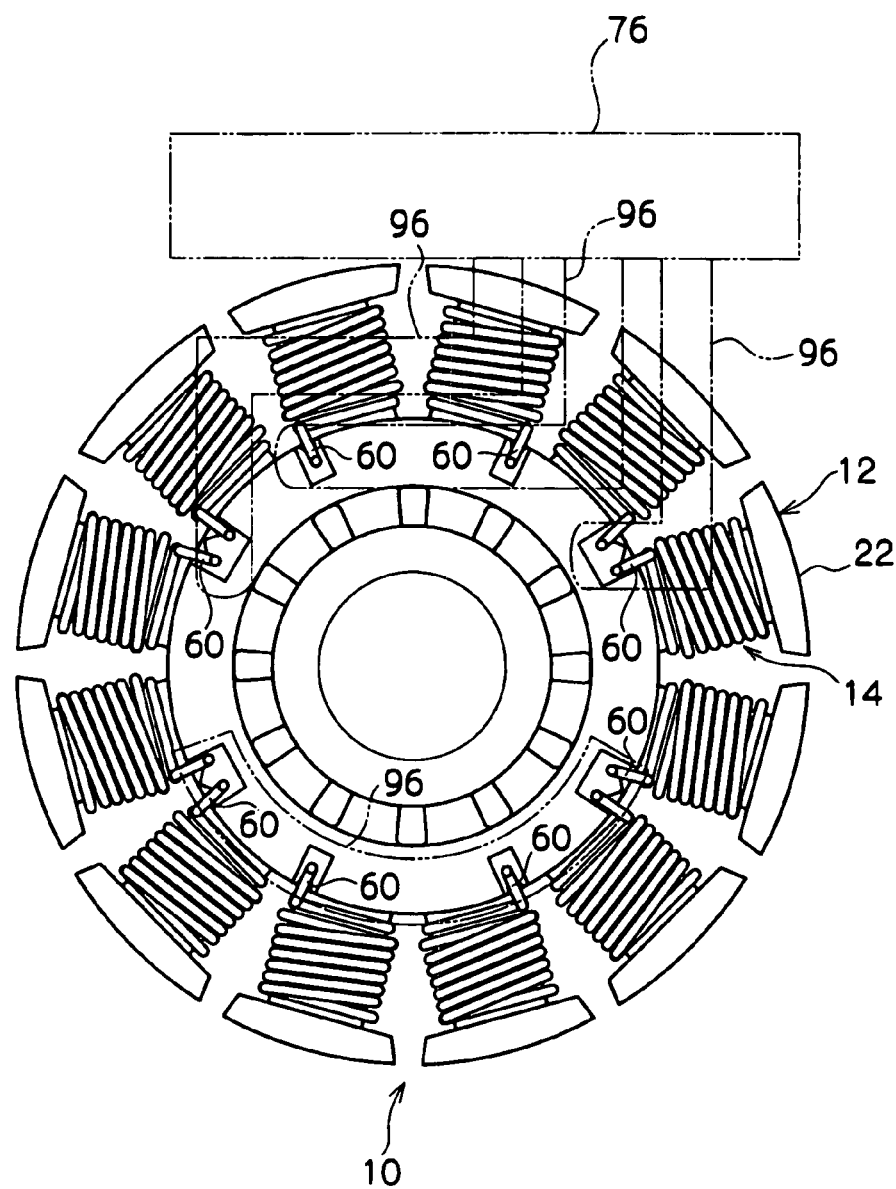
FIG. 7 is a schematic diagram showing installation of the armature to the fan motor according to the first embodiment.

The circuit device 76 is provided integrally to the stator housing 80. As shown in FIG. 7, the circuit device 76 is electrically connected to the winding terminal portions 60 of the windings 14 of the armature 10 through circuit power supply portions (connection terminal plates or conductors) 96. The circuit device 76 sequentially applies electric current to the windings 14 of the armature 10 based on a control signal, which is outputted from an external control device (not shown).

The fan 78 shown in FIG. 6 is provided integrally to an outer peripheral surface of the cylindrical tubular portion 92 of the rotor housing 90. The fan 78 is rotated integrally with the rotor 74 and creates an air flow in a rotational direction of the fan motor 70.

Next, functions of the armature 10 and of the fan motor 70 according to the first embodiment will be described.

Figure 31:
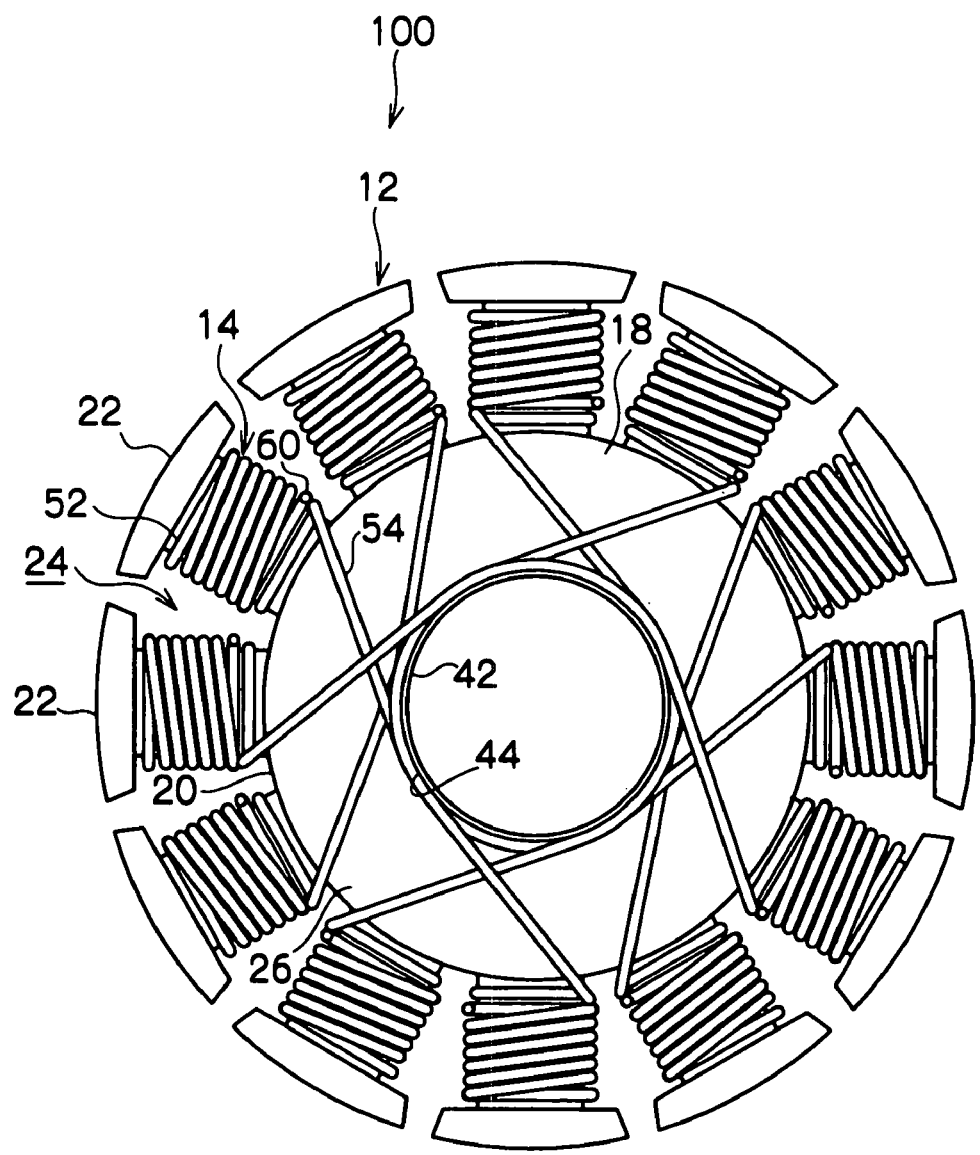
FIG. 31 is a plan view of a previously proposed armature.
Figure 32:
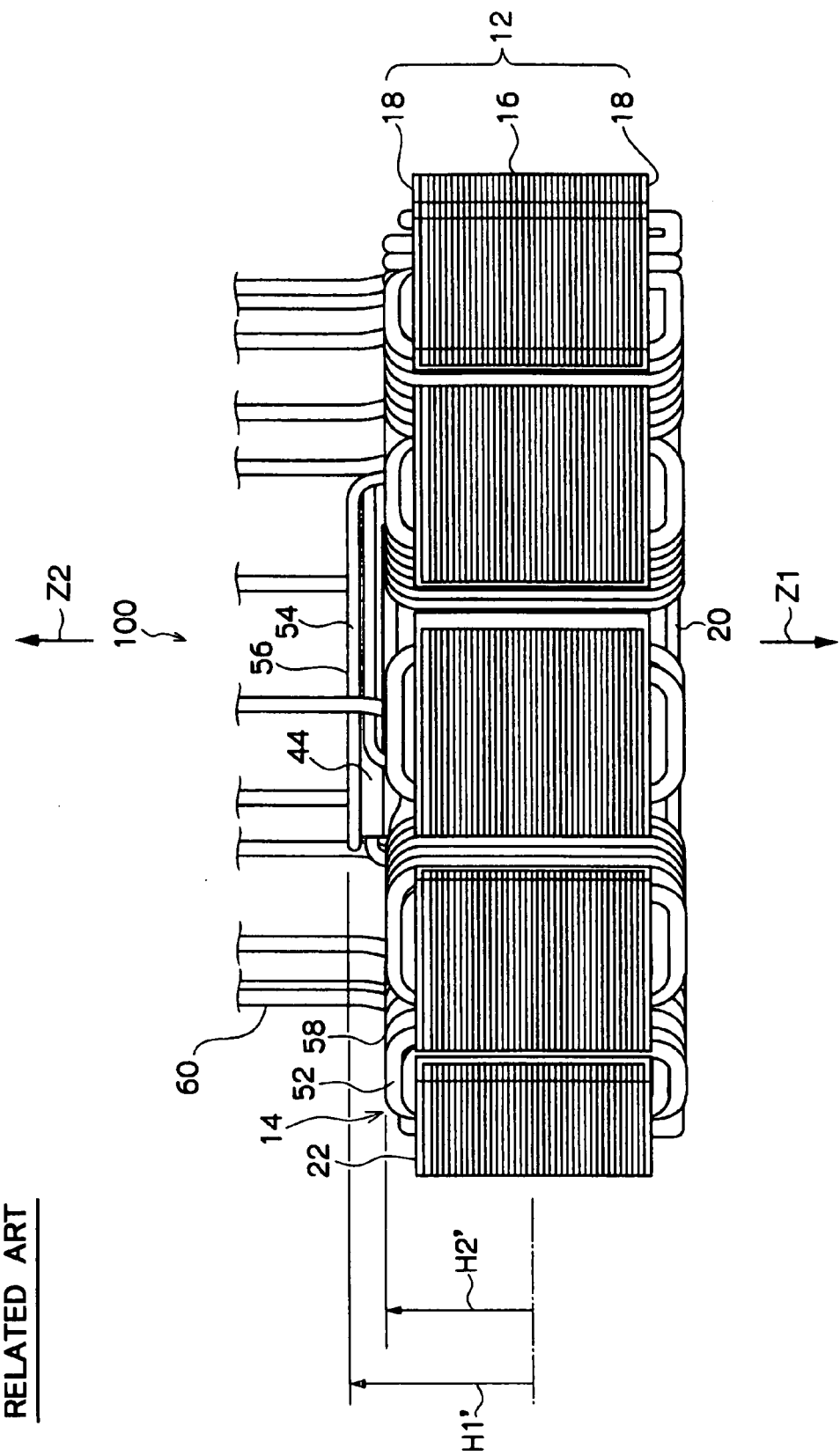
FIG. 32 is a side view of the previously proposed armature shown in FIG. 31.

First, in order to provide better understanding of the functions of the armature 10 and of the fan motor 70 of the first embodiment, an armature 100 of a comparative example will be described. FIGS. 31 and 32 show the armature 100 of the comparative example. In the following description of the armature 100 of the comparative example, components, which are similar to those of the first embodiment, will be indicated by the same reference numerals and will not be described further for the sake of simplicity.

As shown in FIGS. 31 and 32, in the armature 100 of the comparative example, the crossover relieve space 28 (see FIG. 1) is eliminated from the armature 10 of the first embodiment. Thus, in the armature 100 of the comparative example, the crossovers 54 overlap in the axial direction of the stator core 12. Therefore, as shown in FIG. 32, the outermost part 56 of the crossovers 54 is placed axially outward of the outermost part 58 of the wound parts 52 in the axial direction of the ring portion 20. That is, in this comparative example, the height (the axial height measured from the axial center of the ring portion 20) of the outermost part 56 of the crossovers 54 is set to be a height H1', which is larger than the height (the axial height measured from the axial center of the ring portion 20) H2' of the outermost part 58 of the wound parts 52. Thus, in this comparative example, the axial height of the armature 100 is disadvantageously increased.

Furthermore, as shown in FIGS. 31 and 32, unlike the armature 10 (FIG. 2) of the first embodiment, in the armature 100 of the comparative example, the winding terminal portions 60 of each winding 14 are placed on the same axial side where the crossovers 54 are placed. Thus, in a case where each winding 14 is made as a thick winding having a relatively large diameter, the winding terminal portions 60 of each winding 14 may interfere with the crossovers 54, so that the winding operation of the windings 14 may possibly be disadvantageously hindered.

In contrast, in the armature 10 of the first embodiment, the crossover relief space 28 is provided in the end surface 26 of the ring portion 20, which is provided on the second axial side (Z2 side) of the ring portion 20, and the corresponding portion of each crossover 54 is received in the crossover relief space 28. The outermost part 56 of the crossovers 54 is placed axially inward of the outermost part 58 of the wound parts 52 on the second axial side (i.e., Height H1<Height H2 in FIG. 2). Thus, as shown in FIG. 3, even in the case where the crossovers 54 overlap or cross one another in the axial direction of the ring portion 20, it is possible to limit the increase in the axial size of the armature 10. In this way, it is possible to reduce the axial size of the armature 10.

Furthermore, in the armature 10 of the first embodiment, the crossover relief space 28 is formed such that the radial groove width of each slot side groove section 34, which is located radially inward of the corresponding slot 24, is smaller than the radial groove width of each tooth side groove section 36, which is located radially inward of the corresponding tooth portion 22. Thus, the crossover relief space 28 radially extends to each corresponding location that is adjacent to the corresponding tooth portion 22 due to the presence of the corresponding groove section 36. Therefore, the crossover 54, which extends from the corresponding tooth portion 22, can be placed into the crossover relief space 28 at the corresponding location (in the V-shaped section 30) that is adjacent to the tooth portion 22. As a result, even in the case where the crossovers 54 overlap or cross one another in the axial direction of the ring portion 20, the outermost part 56 of the crossovers 54 can be reliably placed axially inward of the outermost part 58 of the wound parts 52, and thereby the increase in the axial size of the armature 10 can be effectively limited.

Furthermore, the fan motor 70 of the first embodiment has the above-described armature 10. Thus, due to the reduction in the axial size of the armature 10, the axial size of the entire motor 70 can be reduced.

In addition, in the armature 10 of the first embodiment, the winding terminal portions 60 of each winding 14 are placed on the first axial side (Z1 side) of the ring portion 20, i.e., on the opposite side of the ring portion 20, which is opposite from the crossovers 54. Therefore, even in the case where each winding 14 is made as the thick winding, it is possible to limit the interference between the winding terminal portions 60 of each winding 14 and the crossovers 54. As a result, the windings 14 can be easily wound around the tooth portions 22, and the winding operation of the windings 14 is eased. Also, the crossovers 54 of the windings 14 are easily held in position by the guide wall 44 having the relatively smooth outer peripheral surface through the frictional engagement without requiring precise positioning of the crossovers 54 into, for example, the guide grooves described in the beginning of the specification. This also eases the winding operation of the windings 14.

With the armature 10 of the first embodiment, the following advantages can be also achieved in addition to the above advantages. That is, in the armature 10 of the first embodiment, the slot side section of the ring portion 20, which is located radially inward of the slot 24, has the larger radial width (radial wall thickness), which is measured from the outer peripheral surface of the ring portion 20 to the crossover relief space 28, in comparison to that of the tooth side section of the ring portion 20, which is located radially inward of the tooth portion 22. Thus, the radial width (radial wall thickness) of the slot side section of the ring portion 20, which is located radially inward of the slot 24 and conducts the greater amount of a magnetic flux in comparison to the tooth side section of the ring portion 20 located radially inward of the tooth portion 22, is increased in comparison to that of the tooth side section of the ring portion 20, which is located radially inward of the tooth portion 22. Therefore, the increase in the magnetic loss and of the iron loss, which would be caused by the provision of the crossover relief space 28 in the ring portion 20, can be limited or minimized.

Furthermore, in the crossover relief space 28 of the armature 10 of the first embodiment, each V-shaped section 30, which is tapered from the radially inner side of the ring portion 20 toward the radially outer side of the ring portion 20, is provided to the corresponding section of the ring portion 20, which is located radially inward of the corresponding tooth portion 22. In this way, the crossover relief space 28 can be formed such that each groove section 34, which is located radially inward of the corresponding slot 24, has the radial groove width, which is smaller than that of the groove section 36, which is located radially inward of the corresponding tooth portion 22.

Next, modifications of the armature 10 and of the fan motor 70 of the first embodiment will be described.

Figure 8:
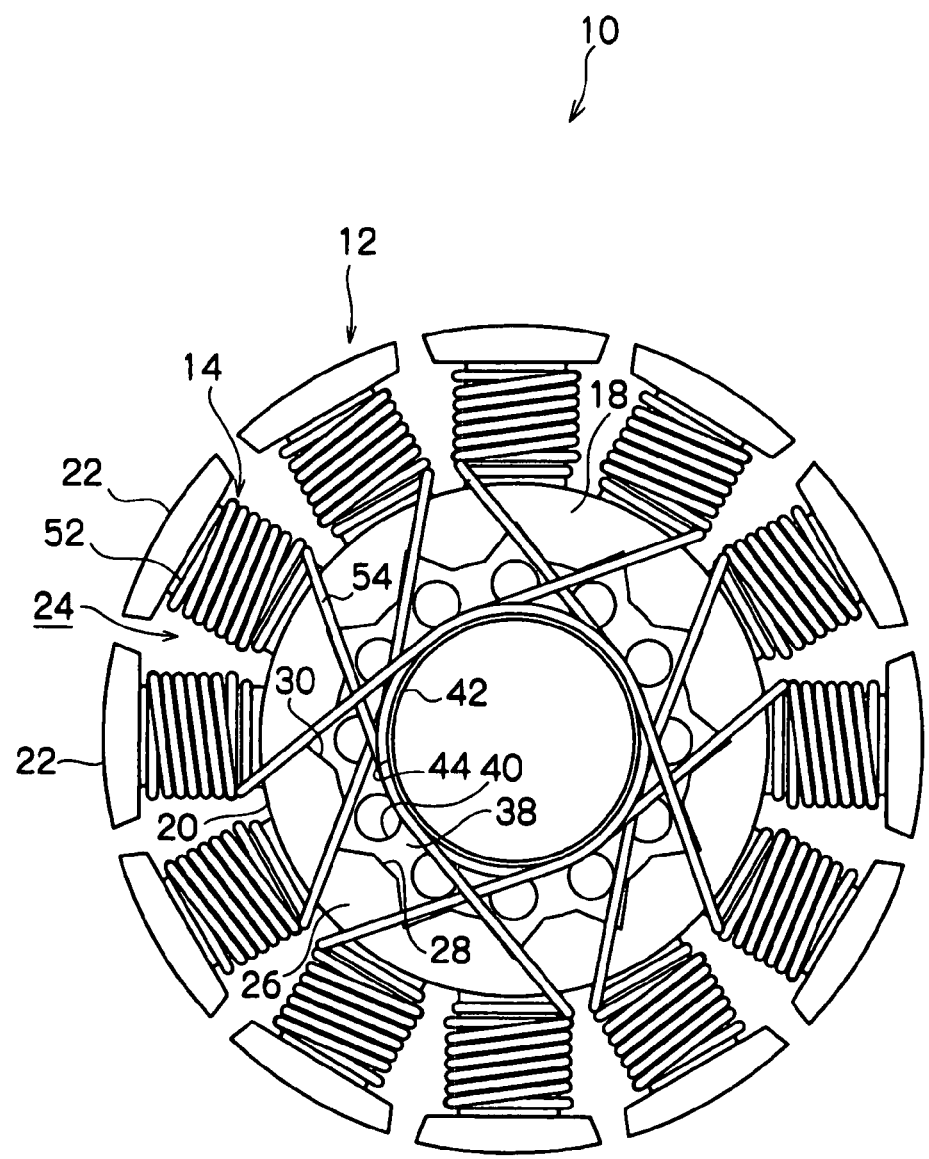
FIG. 8 is a plan view showing a first modification of the armature of the first embodiment.

In the first embodiment, as shown in FIG. 8, a plurality of cooling through holes 40 may be provided in a bottom portion 38 of the crossover relief space 28 to penetrate through the bottom portion 38 of the crossover relief space 28 in the axial direction of the ring portion 20. Furthermore, a plurality of cooling through holes may be provided to extend through a bottom portion 98 of the rotor housing 90 shown in FIG. 6, so that cooling air is blown into the interior of the rotor housing 90 upon rotation of the fan 78.

With the above construction, when the cooling air is supplied into the interior of the rotor housing 90 upon rotation of the fan 78, the cooling air passes through the cooling holes 40 of the crossover relief space 28 shown in FIG. 8. Thereby, the windings 14 and the bearing members 84 (see FIG. 6) can be advantageously cooled with the cooling air.

Figure 9:
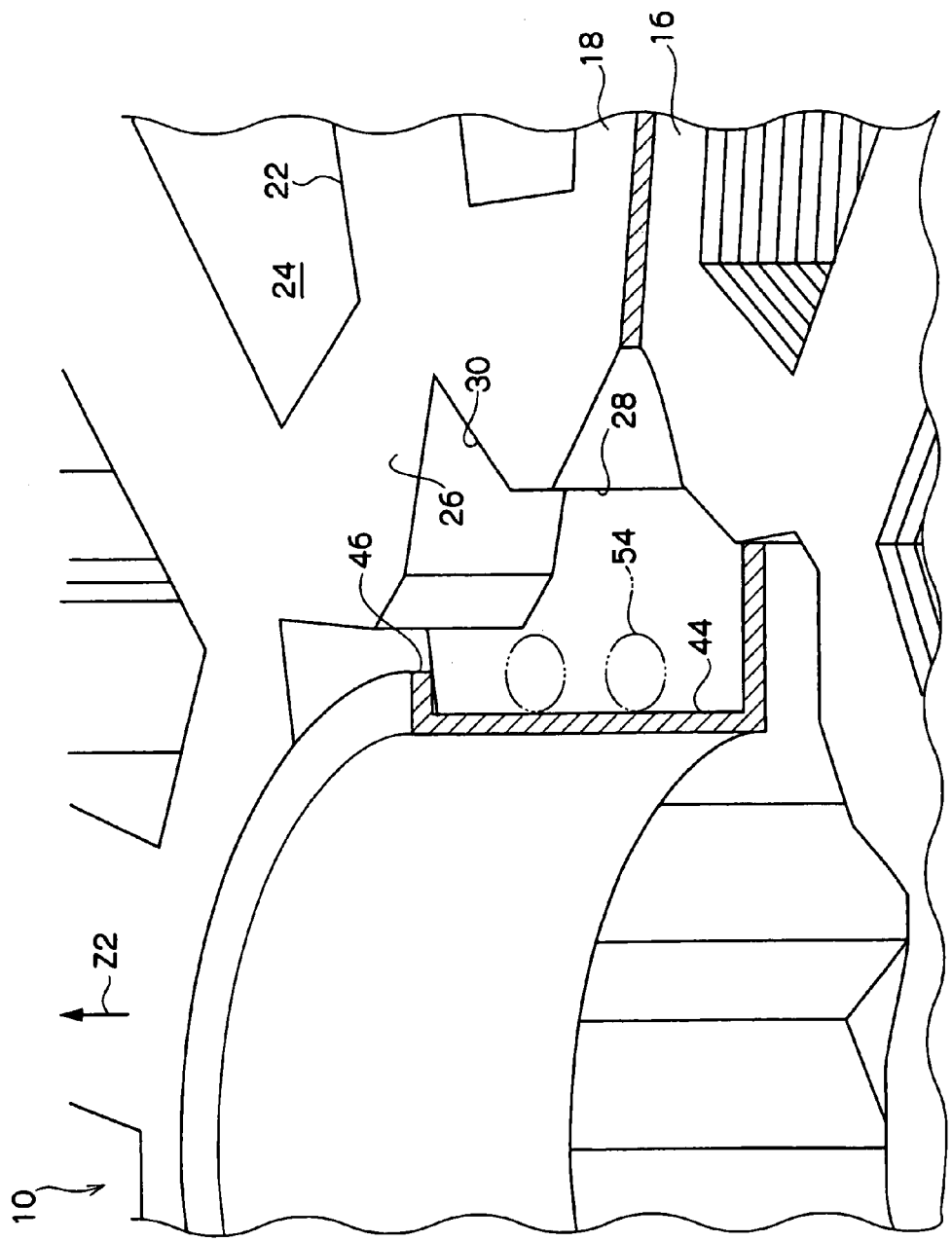
FIG. 9 is an enlarged partial perspective view showing a second modification of the armature of the first embodiment.

Furthermore, in the first embodiment, as shown in FIG. 9, an increased diameter portion 46 may be formed integrally in the cylindrical guide wall 44 at a location that is on a protruding end side (i.e., a side where a protruding end of the guide wall 44 is located) of the crossovers 54 held by the outer peripheral surface of the cylindrical guide wall 44.

In this way, even when a load is applied to each crossover 54 toward the second axial side (Z2 side) of the ring portion 20 to move the crossover 54 toward the second axial side of the ring portion 20 due to, for example, operational vibration of the fan motor 70, each crossover 54 can be advantageously held by the increased diameter portion 46 to limit removal (dismounting) of each crossover 54 from the guide wall 44.

Figure 10:
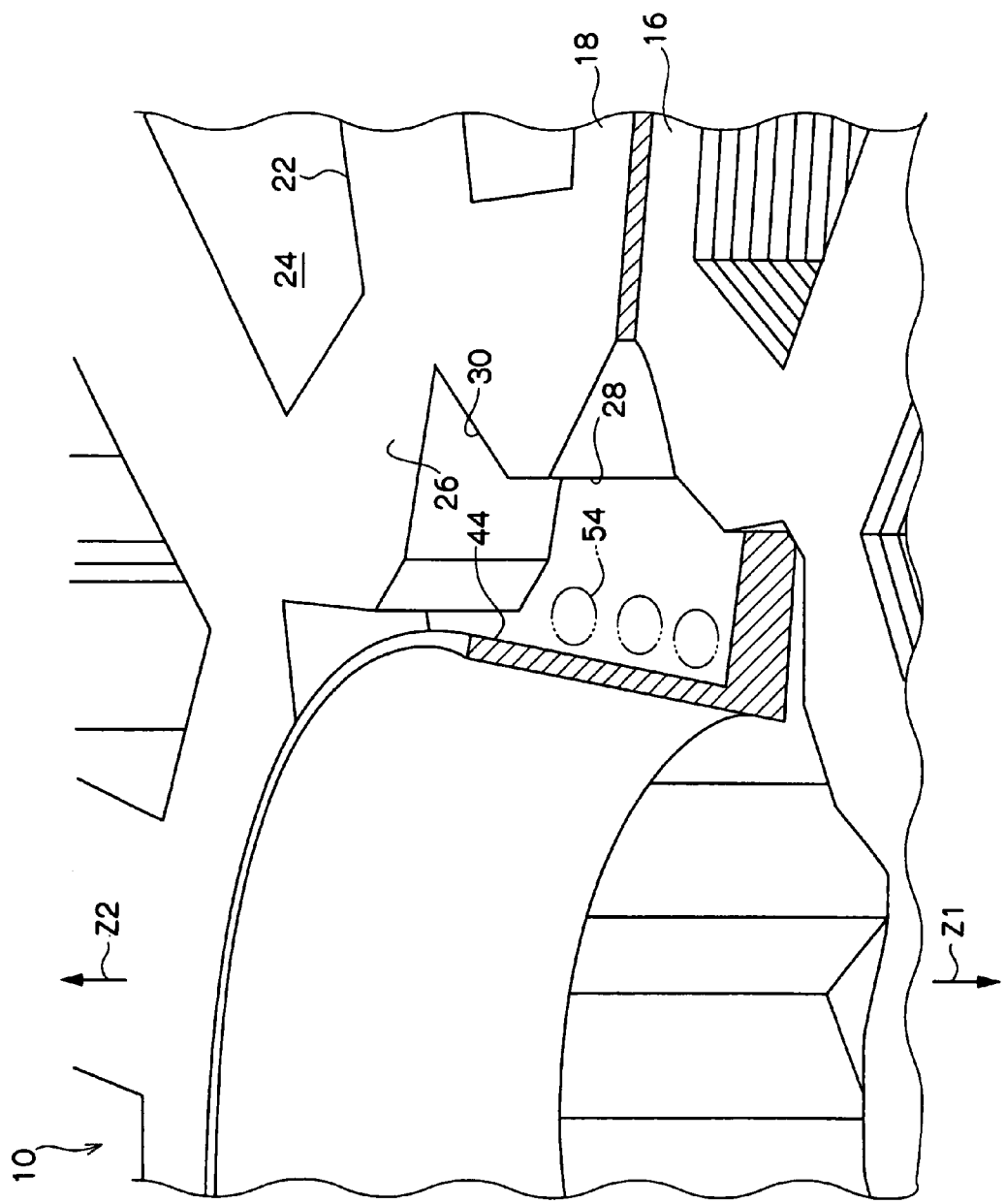
FIG. 10 is an enlarged partial perspective view showing a third modification of the armature of the first embodiment.

Also, in the first embodiment, as shown in FIG. 10, the guide wall 44 may be tapered such that the outer diameter of the guide wall 44 increases from the first axial side (Z1 side) of the ring portion 20 toward the second axial side (Z2 side) of the ring portion 20.

Even with this structure, when the load is applied to the crossovers 54 toward the second axial side (Z2 side) of the ring portion 20 due to, for example, the operational vibration of the fan motor 70, the movement of each crossover 54 toward the protruding end of the guide wall 44 is advantageously limited, so that removal of the crossover 54 from the guide wall 44 can be advantageously limited.

Furthermore, in the modification shown in FIG. 9, the increased diameter portion 46, which is provided to the protruding end side of the respective crossovers 54 in the guide wall 44, is formed integrally with the guide wall 44. However, this may be modified as follows.

Figure 11:
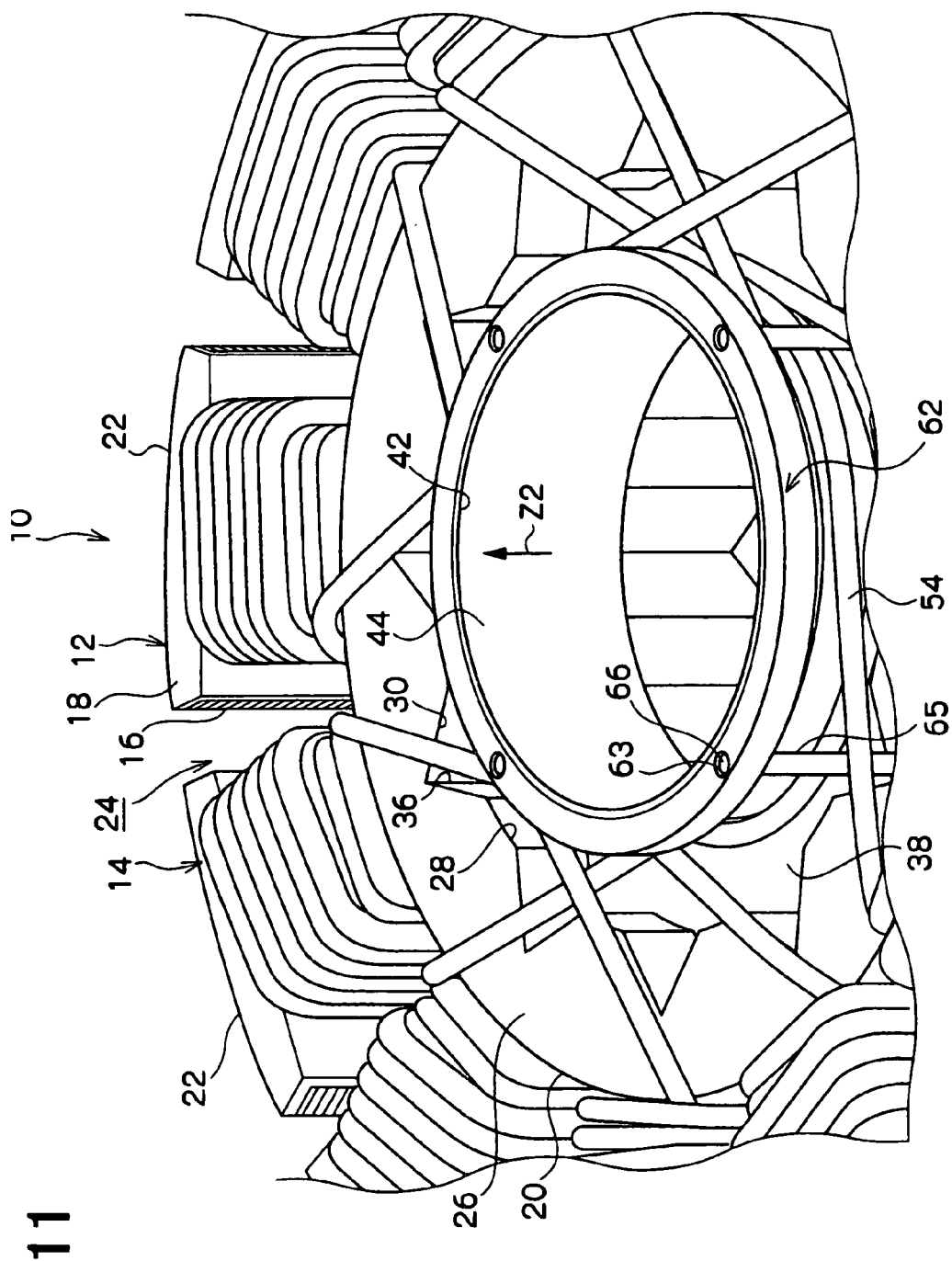
FIG. 11 is an enlarged partial perspective view showing a fourth modification of the armature of the first embodiment.
Figure 12A:
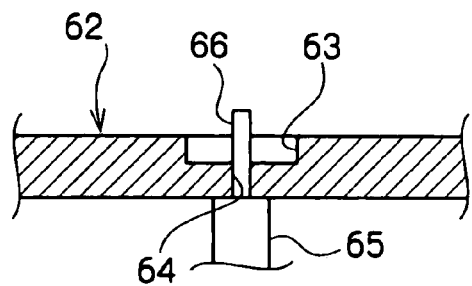
FIGS. 12A and 12B are schematic diagrams showing states before and after hot riveting in the fourth modification of the armature.
Figure 12B:
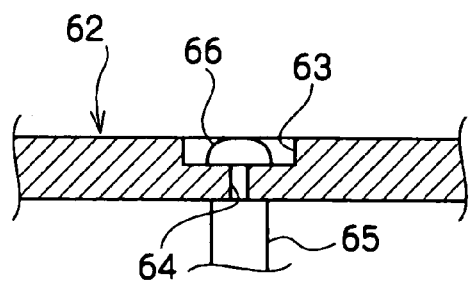

That is, in a modification shown in FIG. 11, in place of the increased diameter portion 46, a flange member (serving as the increased diameter portion) 62 is provided separately from the guide wall 44. The flange member 62 is shaped into an annular body that extends along the outer peripheral surface of the guide wall 44. Furthermore, a plurality (four in this modification) of engaging recesses 63, which are provided one after another in the circumferential direction and serve as engaging portions, is formed in the flange member 62. As shown in FIGS. 12A and 12B, a through hole 64 is formed in each engaging recess 63 to axially penetrates the flange member 62.

As shown in FIG. 11, engaging projections 65, which serve as rod shaped engaging portions, are provided in the portion of the insulator 18, which forms the ring portion 20 of the stator core 12, in such a manner that the engaging projections 65 project from the bottom portion 38 of the crossover relief space 28. In the present modification, four engaging projections 65 are provided one after another in the circumferential direction. As shown in FIG. 12A, a rivet pin (smooth cylindrical connector pin) 66, which has a reduced diameter, is formed in a distal end of each engaging projection 65. In the present modification, as shown in FIGS. 12A and 12B, the rivet pins 66 of the engaging projections 65 are received into the through holes 64, respectively, of the flange member 62, so that as shown in FIG. 11, the flange member 62 is placed on the projecting end of the guide wall 44. Then, in this state, as shown in FIG. 12B, a projecting end of each rivet pin 66 is clinched at the second axial side (Z2 side) through hot riveting, so that each engaging recess 63 and the corresponding engaging projection 65 are engaged, i.e., connected with each other, and the flange member 62 is secured to the projecting end side of the respective crossovers 54 on the guide wall 44.

As discussed above, according to the first embodiment, the flange member 62 is installed to the stator core 12 by engaging each engaging recess 63 with the corresponding engaging projection 65. In this simple manner, the increased diameter portion can be placed on the projecting end side of the respective crossovers 54 on the guide wall 44. Thereby, with the above simple construction, the removal of the respective crossovers 54 from the guide wall 44 can be reliably limited.

Furthermore, according to the present modification, the flange member 62 can be installed to the stator core 12 only by engaging the engaging recesses 63 of the flange member 62 with the engaging projections 65 of the insulator 18. Thereby, with the above simple operation, the removal of the respective crossovers 54 from the guide wall 44 can be reliably limited.

In the above modification, the engaging projections 65 may be formed integrally with the guide wall 44. Furthermore, the engaging projections 65 and the engaging recesses 63 may be engaged with each other by any other means, which is other than the hot riveting. For example, the engaging projections 65 and the engaging recesses 63 may be engaged with each other by snap-fit. In this way, the installation of the flange member 62 to the stator core 12 is eased. Further alternatively, the flange member 62 may be fixed to the guide wall 44 by, for example, screws.

Figure 13:
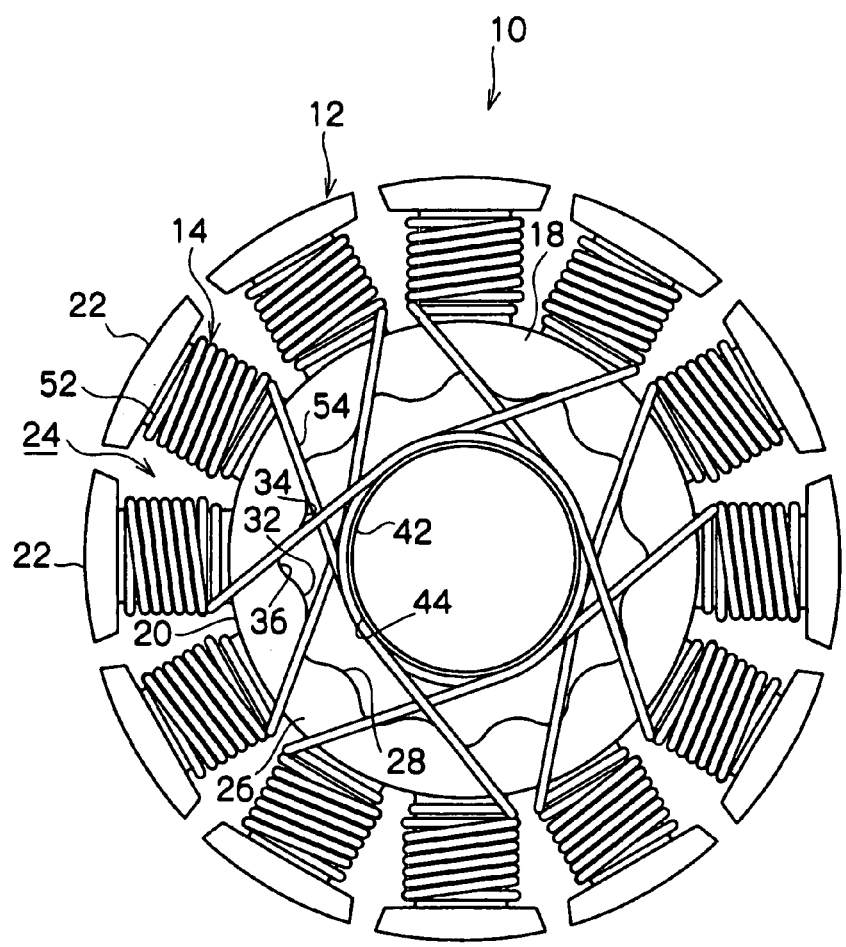
FIG. 13 is a plan view showing a fifth modification of the armature of the first embodiment.

In the first embodiment, the V-shaped sections 30 are provided to the crossover relief space 28 such that each of the V-shaped sections 30 is located radially inward of the corresponding one of the tooth portions 22 and is tapered from the radially inner side of the ring portion 20 toward the radially outer side of the ring portion 20. Alternatively, as shown in FIG. 13, arcuate sections (arcuate recesses) 32 may be provided to the crossover relief space 28 such that each of the arcuate sections 32 is located radially inward of a corresponding one of the tooth portions 22 and is radially outwardly recessed from the inner peripheral surface of the ring portion 20.

Even in this way, the crossover relief space 28 can be formed such that each slot side groove section 34, which is located radially inward of the corresponding slot 24, has the radial groove width, which is smaller than that of the tooth side groove section 36, which is located radially inward of the corresponding tooth portion 22.

Furthermore, in the first embodiment, the crossover relief space 28 is formed as the annular groove. Alternatively, the crossover relief space 28 may be formed by a plurality of arcuate grooves, each of which extends in the circumferential direction of the ring portion 20.

Furthermore, in the first embodiment, the portions of the crossovers 54 are received in the crossover relief space 28, and the outermost part 56 of the crossovers 54 is placed axially inward of the outermost part 58 of the wound parts 52. Alternatively, the outermost part 56 of the crossovers 54 may be placed to the same axial position as that of the outermost part 58 of the wound parts 52. That is, with reference to FIG. 2, the height H1 may be set to be the same as the height H2 (i.e., H1=H2), so that the axial height of the outermost part 56 of the crossovers 54, which is measured from the axial center of the ring portion 20, coincides with that of the outermost part 58 of the Wound parts 52.

Second Embodiment

A structure of a fan motor 70 according to a second embodiment of the present invention will be described.

Figure 14:
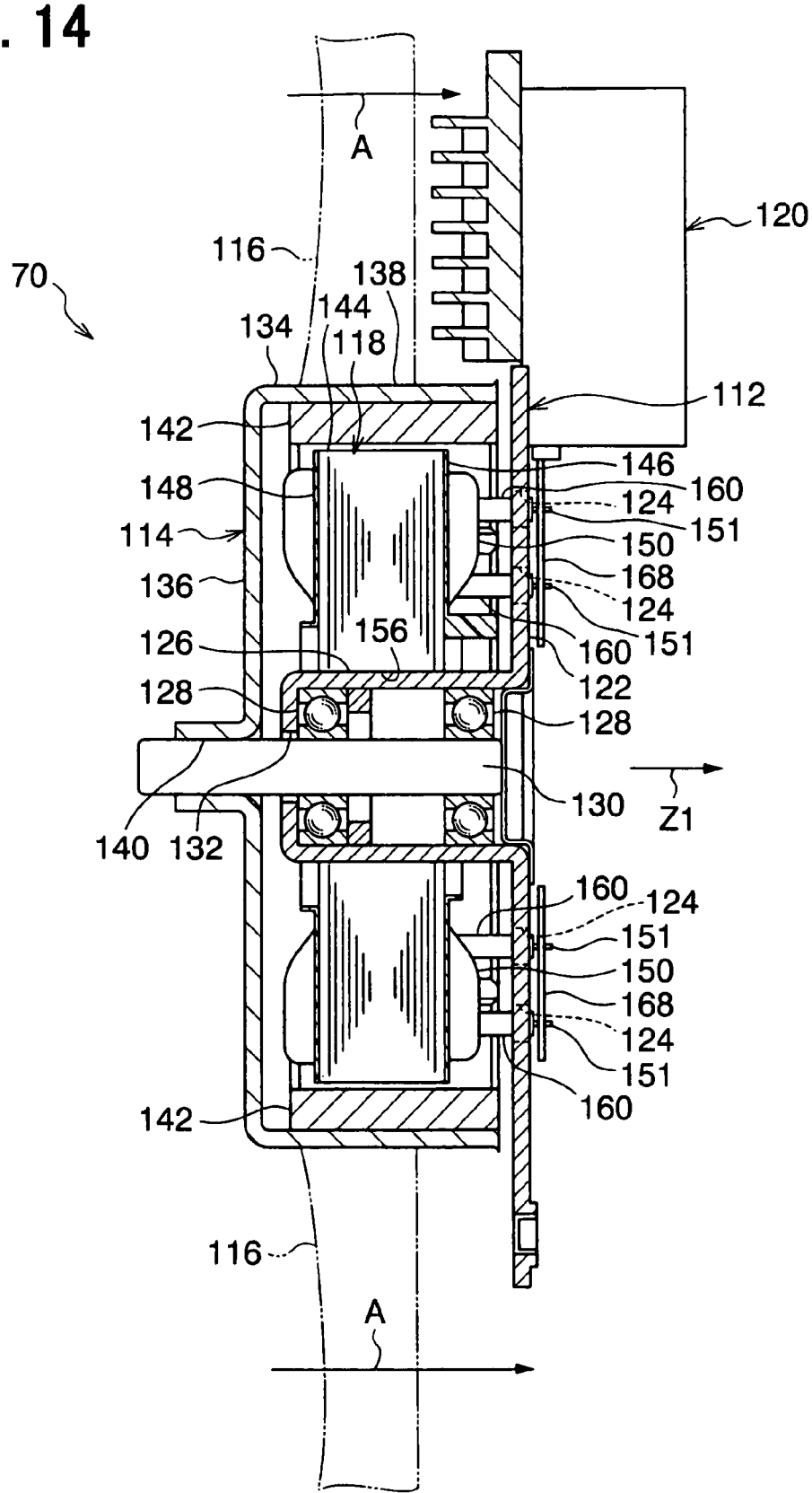
FIG. 14 is an axial cross sectional view of a fan motor according to a second embodiment.

FIGS. 14 to 19 show the structure of the fan motor 70 according to the second embodiment of the present invention. The fan motor 70 shown in these drawings is for cooling the radiator of the vehicle. As shown in FIG. 14, the fan motor 70 includes a stator housing (also referred to as a centerpiece) 112, a rotor 114, a fan 116, an armature (stator) 118 and a control circuit device 120.

Figure 17:
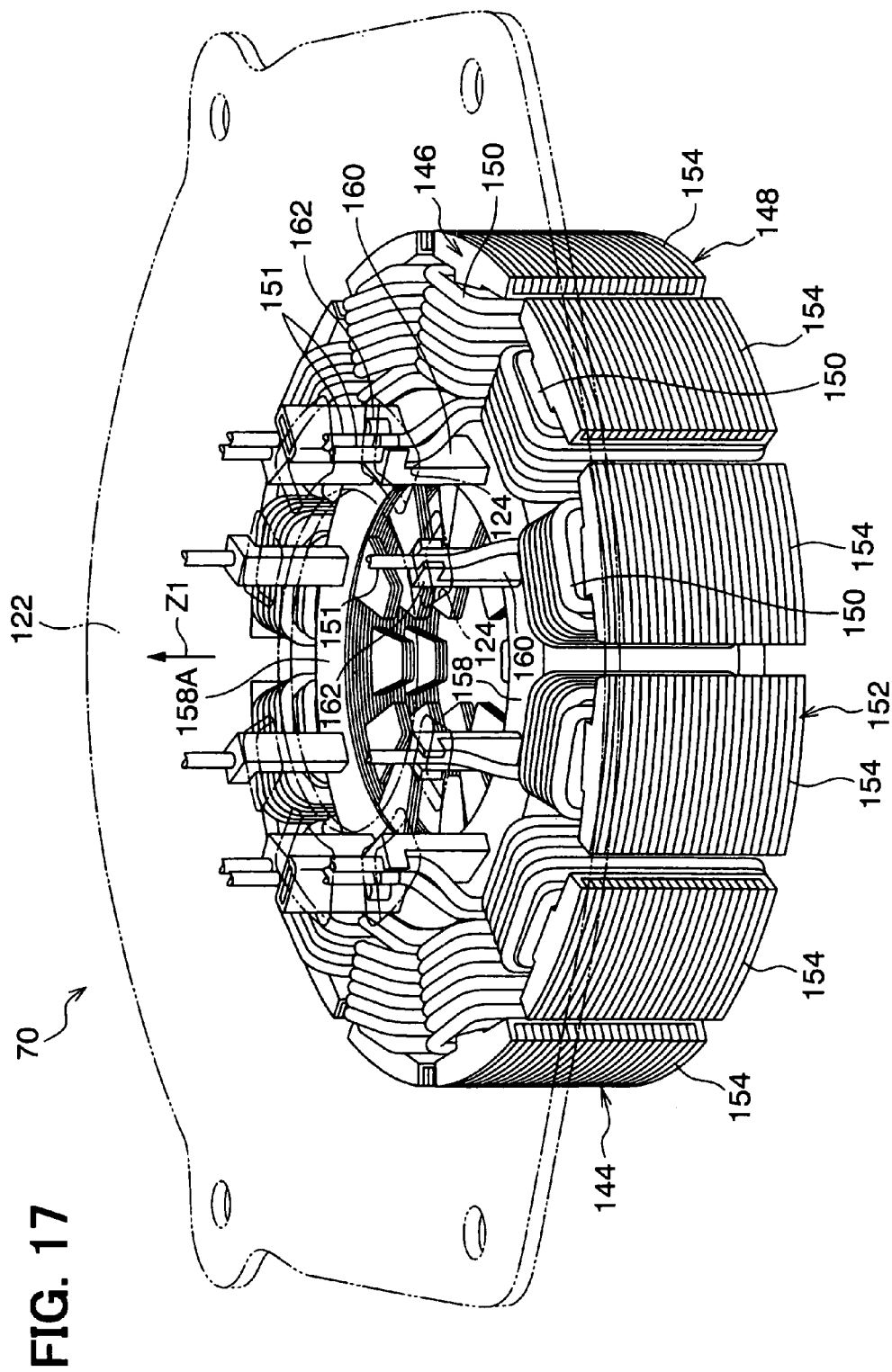
FIG. 17 is a perspective view of an armature and a stator housing of the fan motor of the second embodiment.

The stator housing 112 is made of an iron material and includes a main body support portion 122. The main body support portion 122 is axially placed between circuit power supply portions (connection terminal plates or conductors) 168 of the circuit device 120 and the armature 118. As shown in FIGS. 14 and 17, the main body support portion 122 includes a plurality of receiving holes 124, which are arranged one after another in a circumferential direction and penetrate through the main body support portion 122 in a plate thickness direction (axial direction of the armature 118).

As shown in FIG. 14, a tubular portion 126 is provided integrally at a center part of the main body support portion 122. Two bearing members 128 are received in the tubular portion 126 and rotatably support a rotatable shaft 130. One longitudinal end portion of the rotatable shaft 130 projects outwardly through a hole 132, which penetrates through a bottom of the tubular portion 126.

The rotor 114 includes a cup-shaped rotor housing 134. A tubular engaging portion 140 is formed in a center part of a bottom portion 136 of the rotor housing 134, and a projecting end of the rotatable shaft 130 is fitted through a hole of the engaging portion 140. Furthermore, permanent magnets 142 are fixed to an inner peripheral surface of a cylindrical tubular portion 138 of the rotor housing 134 and are radially opposed to a laminated core 144, which is provided in the armature 118 and will be described latter.

The fan 116 is provided integrally to an outer peripheral surface of the cylindrical tubular portion 138 of the rotor housing 134. The fan 116 is rotated integrally with the rotor 114 to create an air flow in an axial direction of the fan motor 70, as indicated by an arrow A in FIG. 14.

The armature 118 includes the laminated core 144, a plurality (two in this instance) of insulators 146, 148 and a plurality of windings 150. Here, it should be noted that the insulators 146, 148 may also be collectively referred to as an insulator or an insulator arrangement. As shown in FIG. 17, the laminated core 144 is formed by axially stacking a plurality of core sheets 152, which have radially extending tooth portions 154. As shown in FIG. 14, a through hole 156 axially penetrates through a center part of the laminated core 144. The tubular portion 126 is fitted into the through hole 156, so that the armature 118 is entirely supported by the stator housing 112.

The insulators 146, 148 are made of a synthetic resin material and are axially installed to the laminated core 144 from opposite axial sides, respectively. As shown in FIG. 17, a ring portion 158 is formed in one of the insulators 146, 148, which is located on the first axial side (Z1 side), at a location radially inward of the tooth portions 154 of the laminated core 144. A plurality (eight in this instance) of guides 160 axially projects from an axial end surface 158A of the ring portion 158 on the first axial side (Z1 side).

Figure 16:
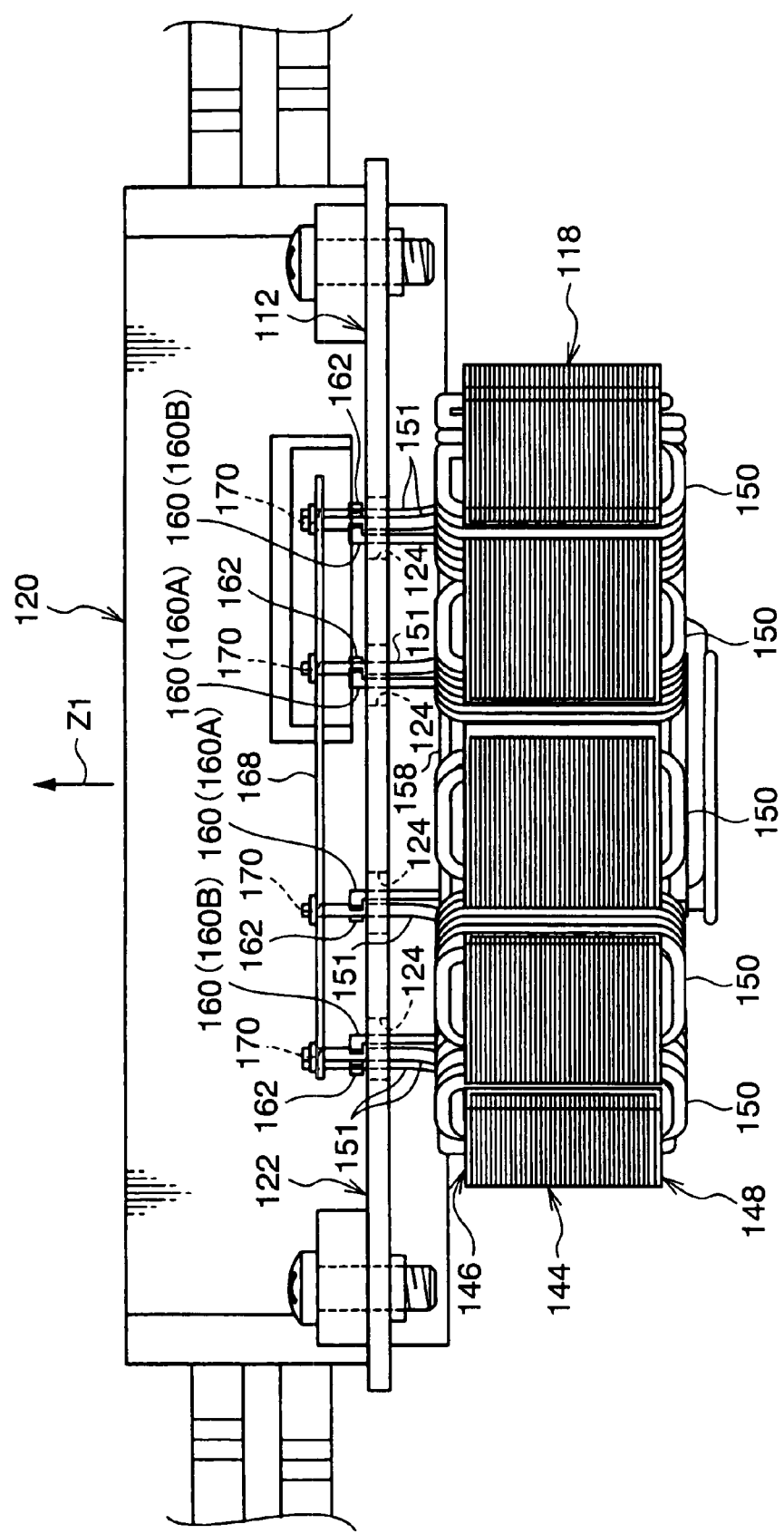
FIG. 16 is a schematic side view of the fan motor (except a rotor and a fan) shown in FIG. 14.

The guides 160 are provided one after another along a common imaginary circle about a central axis of the armature 118 to guide winding terminal portions 151 of the windings 150, which are wound around the tooth portions 154 through the insulators 146, 148, to the circuit power supply portions 168. Each guide 160 is placed radially inward of slots provided in the insulators 146, 148. Furthermore, as shown in FIG. 16, the guides 160 extend axially linearly from the ring portion 158 toward connection holes 170, respectively, which are provided to the circuit power supply portions 168 and will be described latter. The axial height of the respective guides 160 is generally the same.

Figure 18:
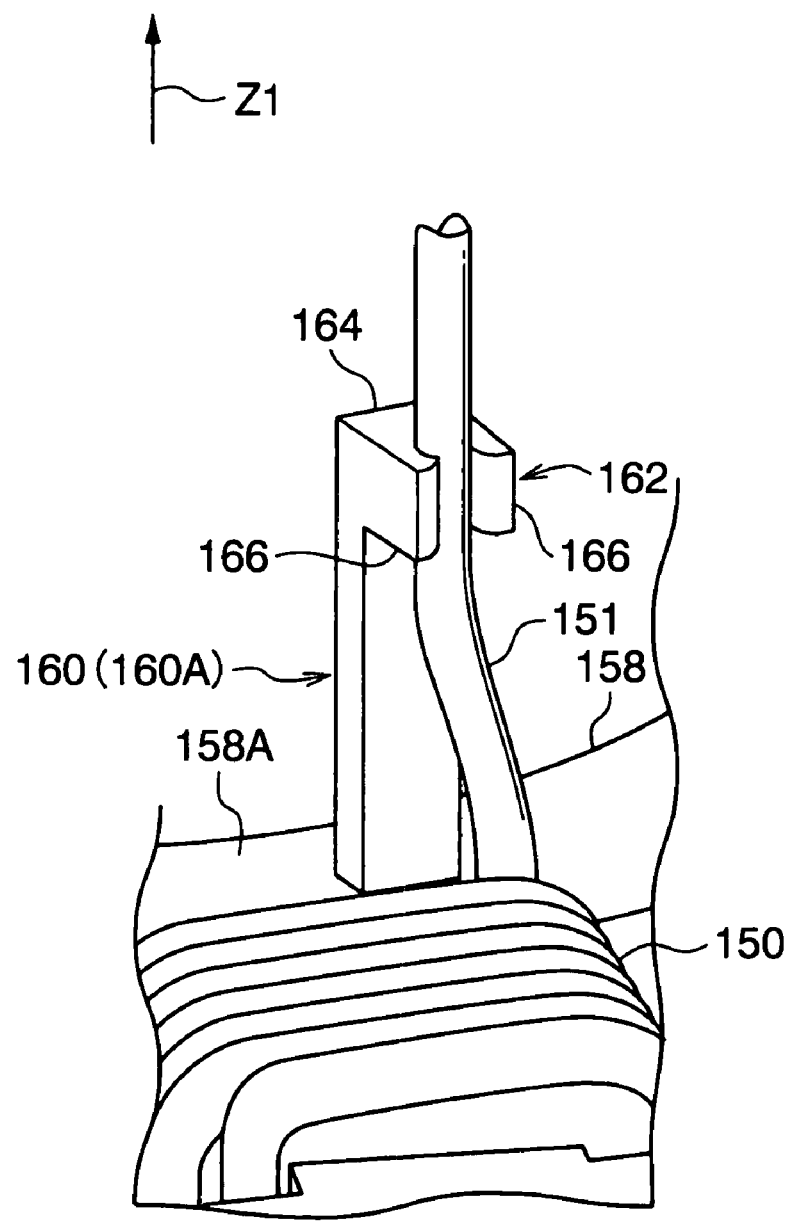
FIG. 18 is a partial enlarged view of the armature shown in FIG. 17.
Figure 19:
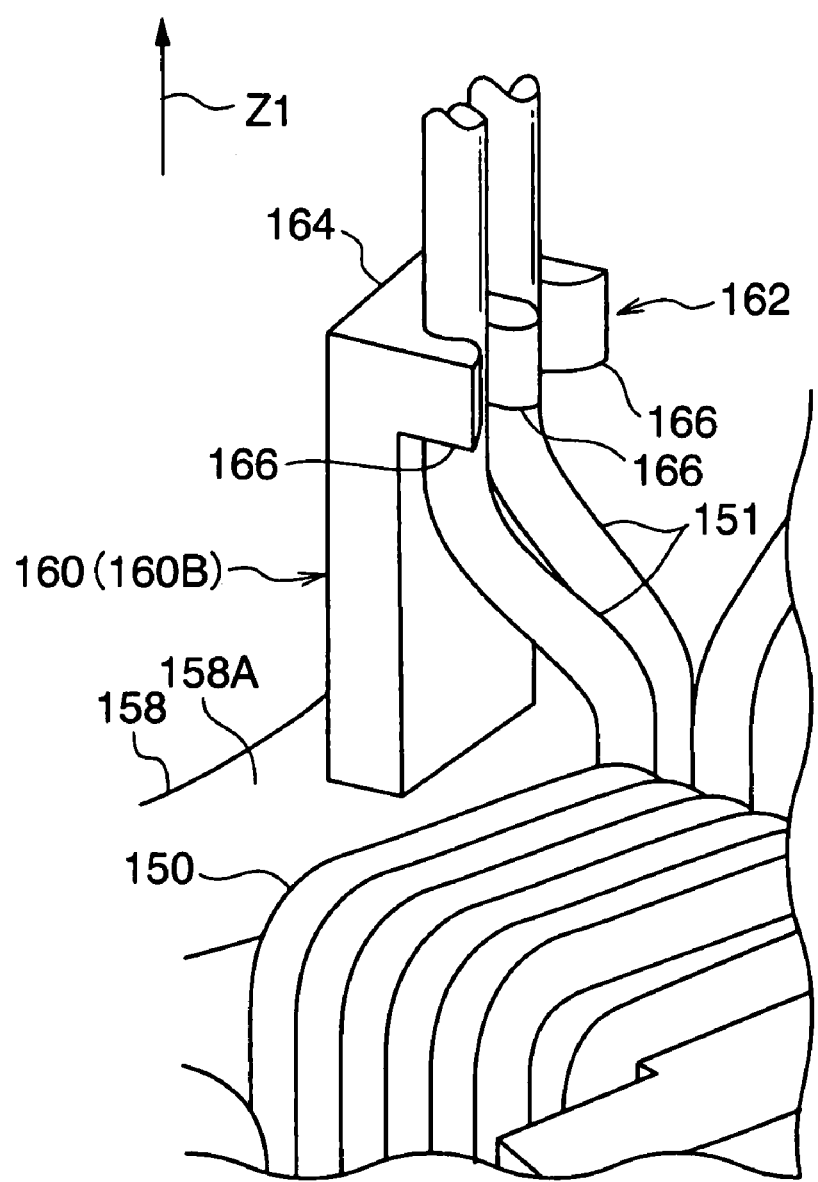
FIG. 19 is another partial enlarged view of the armature shown in FIG. 17.

Furthermore, in the present embodiment, the guides 160 are of two types. Specifically, as shown in FIG. 18, the guide 160 (guide 160A) of one type guides corresponding one of the winding terminal portions 151. Also, as shown in FIG. 19, the guide 160 (guide 160B) of the other type guides corresponding two of the winding terminal portions 151.

Furthermore, a holder 162 is provided at a projecting end side of each guide 160. Each holder 162 has a snap-fit structure (thereby serving as a snap-fit holder). Specifically, each holder 162 has a plurality of holding pieces 166, which are resiliently deformable relative to a base 164. Each winding terminal portion 151 is clamped by adjacent holding pieces 166.

Figure 15:
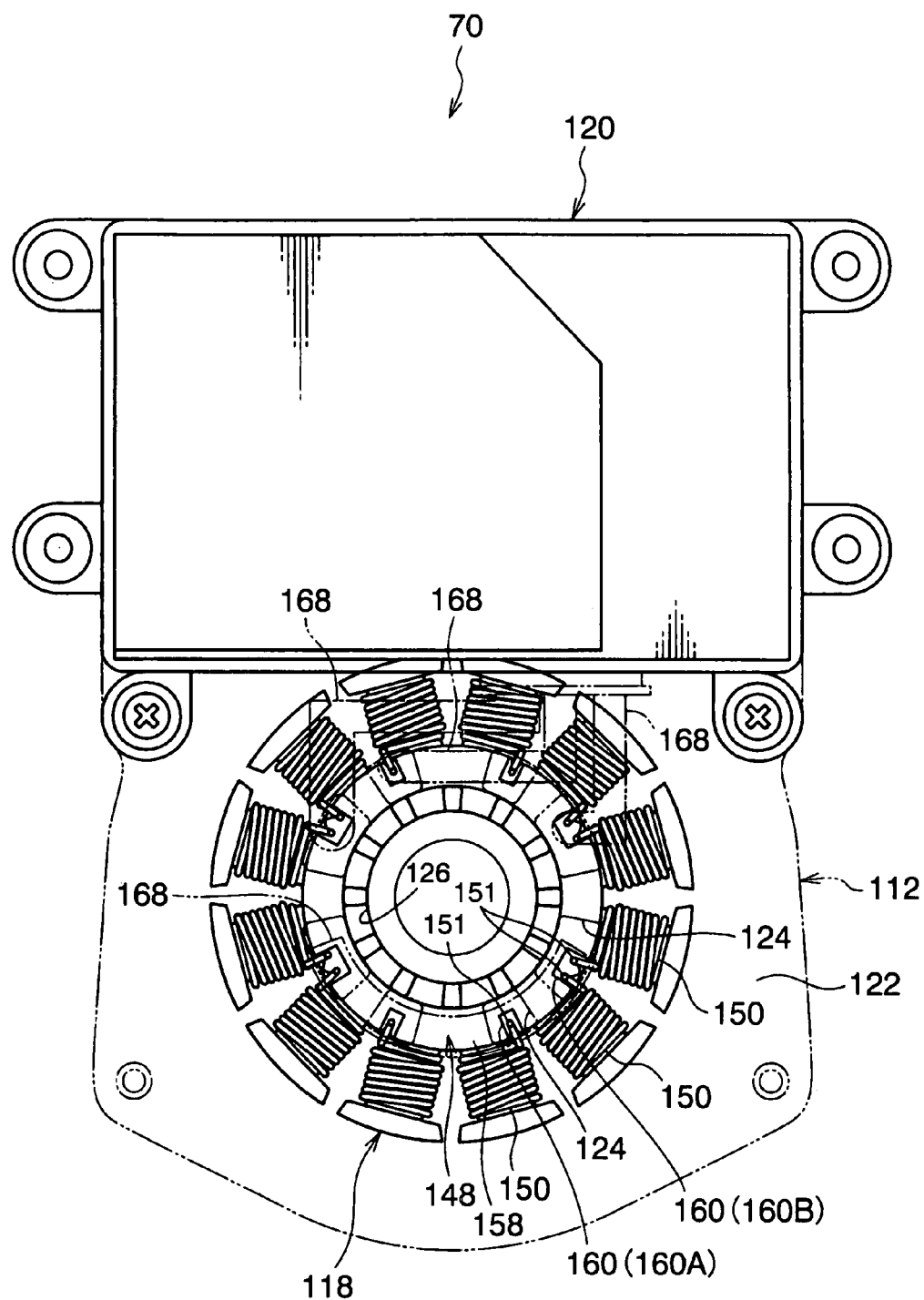
FIG. 15 is a plan view of the fan motor (except a rotor and a fan) shown in FIG. 14.

As shown in FIGS. 14 and 15, the circuit device 120 is integrally supported by the main body support portion 122, which is provided in the stator housing 112. The circuit power supply portions 168 (connection terminal plates) are provided to the circuit device 120. Each circuit power supply portion 168 is provided on the first axial side (Z1 side) of the armature 118. As shown in FIG. 16, each circuit power supply portion 168 has one or more connection holes 170 (each serving as a connecting portion), each of which is provided along an imaginary extension line that extends from the corresponding guide 160. A distal end part of each winding terminal portion 151, which is held by the corresponding guide 160 and is received in the corresponding receiving hole 124, is electrically connected to the periphery of the corresponding connection hole 170. The circuit device 120 sequentially applies the electric current to the windings 150 based on a control signal, which is outputted from an external control device (not shown).

Next, functions and advantages of the fan motor 70 according to the second embodiment of the present invention will be described.

The stator housing 112, the armature 118 and the circuit device 120 of the fan motor 70 are assembled together, for example, in the following manner. That is, as shown in FIGS. 16 and 17, the insulators 146, 148 are axially installed to the laminated core 144 from the opposite axial sides, respectively. Then, the windings 150 are wound around the tooth portions 154 of the laminated core 144 over the insulators 146, 148 (i.e., the insulators 146, 148 being interposed therebetween). At this time, the terminal portions of the windings 150 extend out from the armature 118 on the first axial side (Z1 side) of the armature 118, and the winding terminal portions 151 are held by the holders 162, which are provided in the guides 160, as shown in FIGS. 18 and 19. The winding terminal portions 151 are snap-fitted to and are thereby fixed to the holders 162.

The above assembled armature 118 is installed to the stator housing 112, and the circuit device 120 is installed to the stator housing 112. At this time, as shown in FIG. 16, the guides 160 and the winding terminal portions 151, which are guided by the guides 160, are received through the receiving holes 124 of the main body support portion 122 of the stator housing 112. Then, the guides 160 and the distal end parts of the winding terminal portions 151 are placed on the circuit power supply portion 168 side of the main body support portion 122 of the stator housing 112. Also, the winding terminal portions 151, which are guided to the circuit power supply portions 168 by the guides 160, are inserted into the connection holes 170 of the circuit power supply portions 168 from the lower side (the second axial side). Then, the projecting parts of the winding terminal portions 151, which project upward from the connection holes 170 on the first axial side (Z1 side), are electrically connected to the peripheries of the connection holes 170 of the circuit power supply portions 168 by, for example, soldering or welding (including laser welding).

As described above, in the fan motor 70 of the second embodiment, the circuit power supply portions 168 of the circuit device 120 are provided on the first axial side (Z1 side) of the armature 118, and the winding terminal portions 151, which extend out from the armature 118, are guide to the circuit power supply portions 168 by the guides 160 and are directly electrically connected to the circuit power supply portions 168 without using the intermediate terminals or the like. Thus, unlike the previously proposed structure, it is not required to provide the intermediate terminals, and thereby the costs can be reduced.

In the case where the winding terminal portions 151 are directly electrically connected to the circuit power supply portions 168 without using the intermediate terminals like in the case of the fan motor 70 of the second embodiment of the present invention, the winding terminal portions 151 need to be appropriately guided to the circuit power supply portions 168 in order to ease the connecting operation for connecting the winding terminal portions 151 to the circuit power supply portions 168 or to maintain the good connection between the winding terminal portions 151 and the circuit power supply portions 168.

With respect to this point, in the fan motor 70 of the second embodiment, the winding terminal portions 151 are guided to the circuit power supply portions 168 by the guides 160, which extend from the insulator 146 on the first axial side (Z1 side) of the armature 118. Therefore, the winding terminal portions 151 can be appropriately guided to the circuit power supply portions 168, so that the connecting operation for connecting the winding terminal portions 151 to the circuit power supply portions 168 is eased, and the good connection between the winding terminal portions 151 and the circuit power supply portions 168 can be maintained.

Furthermore, in the fan motor 70 of the second embodiment, the guides 160 extend axially from the insulator 146 toward the connection holes 170 of the circuit power supply portions 168. Thus, the projecting ends of the guides 160 are placed adjacent to the connection holes 170 of the circuit power supply portions 168. Therefore, the winding terminal portions 151 can be appropriately guided to the connection holes 170 of the circuit power supply portions 168.

Also, in the fan motor 70 of the second embodiment, the winding terminal portions 151 are held by the holders 162 of the guides 160. Therefore, the winding terminal portions 151 are stably positioned in place by the guides 160, so that the winding terminal portions 151 can be appropriately guided to the circuit power supply portions 168. Furthermore, the holders 162 have the snap-fit structure. Therefore, the winding terminal portions 151 can be easily fixed to the holders 162. In this way, the fixing operation for fixing the winding terminal portions 151 to the holders 162 can be improved. Also, unintentional removal of the winding terminal portions 151 from the holders 162 during the connecting operation for connecting the winding terminal portions 151 to the circuit power supply portions 168 can be limited.

Furthermore, in the fan motor 70 of the second embodiment of the present invention, the guides 160 are provided along the common imaginary circle about the central axis of the armature 118 and extend to the same axial height. In this way, positioning between the guides 160 and the circuit power supply portions 168 in both of the circumferential direction and the axial direction can be easily made.

Also, in the case of the fan motor 70 of the second embodiment of the present invention, at the time of electrically connecting the winding terminal portions 151 to the circuit power supply portions 168 by, for example, the soldering or welding (including the laser welding), an electrode, which is used for the soldering or welding, needs to be moved all around the central axis of the armature 118 only once. As a result, the soldering or welding can be eased. Also, the number of assembling steps can be reduced, and thereby the costs can be reduced.

Furthermore, in the case of the fan motor 70 of the second embodiment, the guides 160 and the winding terminal portions 151 are received through the receiving holes 124 of the main body support portion 122 of the stator housing 112. Therefore, the projecting ends of the guides 160 and the distal ends of the winding terminal portions 151 are placed on the circuit power supply portion 168 side of the main body support portion 122 of the stator housing 112. Therefore, even in the case where the plate-shaped main body support portion 122 is provided in the stator housing 112 at the axial location between the armature 118 and the circuit power supply portions 168, the connecting operation for connecting the winding terminal portions 151 to the circuit power supply portions 168 can be easily performed.

Furthermore, in the case of the fan motor 70 of the second embodiment of the present invention, even when the stator housing 112 made of the iron material is provided, the winding terminal portions 151 can be electrically insulated from the stator housing 112 by guiding the winding terminal portions 151 with the guides 160 made of the resin material.

Also, in the case of the fan motor 70 of the second embodiment of the present invention, the connections between the winding terminal portions 151 and the circuit power supply portions 168 are all placed on the first axial side (Z1 side) of the armature 118, so that a waterproof structure for protecting the connections between the winding terminal portions 151 and the circuit power supply portions 168 from application of water can be made simple.

Also, in the case of the fan motor 70 of the second embodiment of the present invention, the holders 162 are provided at the projecting end parts of the guides 160 and are thereby spaced from the end surface 158A of the ring portion 158 on the first axial side (Z1 side) of the armature 118. Therefore, at the time of winding the windings 150 around the tooth portions 154 of the laminated core 144 over the insulators 146, 148, it is possible to limit the interference between a winding machine for winding the windings 150 and the holders 162 of the guides 160.

Furthermore, in the case of the fan motor 70 of the second embodiment of the present invention, the insulator 146 has the ring portion 158, which is placed radially inward of the tooth portions 154, and the guides 160 project from the end surface 158A of the ring portion 158, which is located on the first axial side (Z1 side) of the armature 118. As a result, due to the projection of the guides 160 from the ring portion 158, the guides 160 are radially inwardly displaced from the tooth portions 154. Therefore, at the time of winding the windings 150 around the tooth portions 154 over the insulators 146, 148, the guides 160 do not interfere this winding operation of the windings 150.

Also, in the case of the fan motor 70 according to the second embodiment of the present invention, the circuit device 120 is provided integrally. Thus, when the fan motor 70 is installed to a vehicle, it is not required to provide two separate installation locations for installing the motor main body (the stator housing 112, the rotor 114 and the armature 118) and for the circuit device 120. As a result, the installation operation of the fan motor 70 along with the circuit device 120 to the vehicle and the installation space of the vehicle for accommodating the fan motor 70 along with the circuit device 120 can be reduced.

Next, a modification of the fan motor 70 according to the second embodiment of the present invention will be described.

In the above embodiment, the holders 162 are provided to the guides 160, and the winding terminal portions 151 are fixed to the holders 162 by the snap-fitting. This may be modified as follows.

Figure 20:
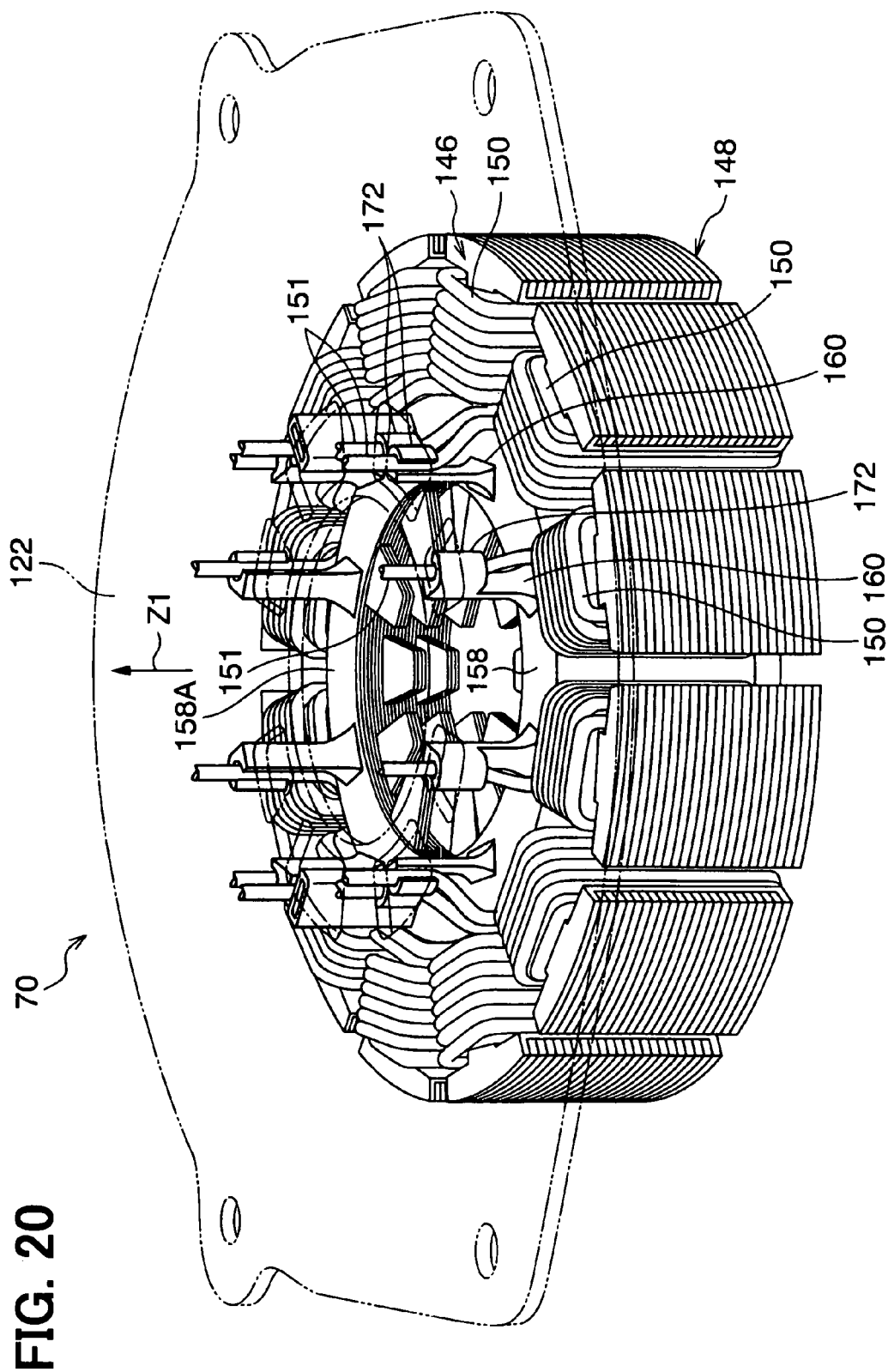
FIG. 20 is a perspective view showing a modification of the armature of the second embodiment.
Figure 21:
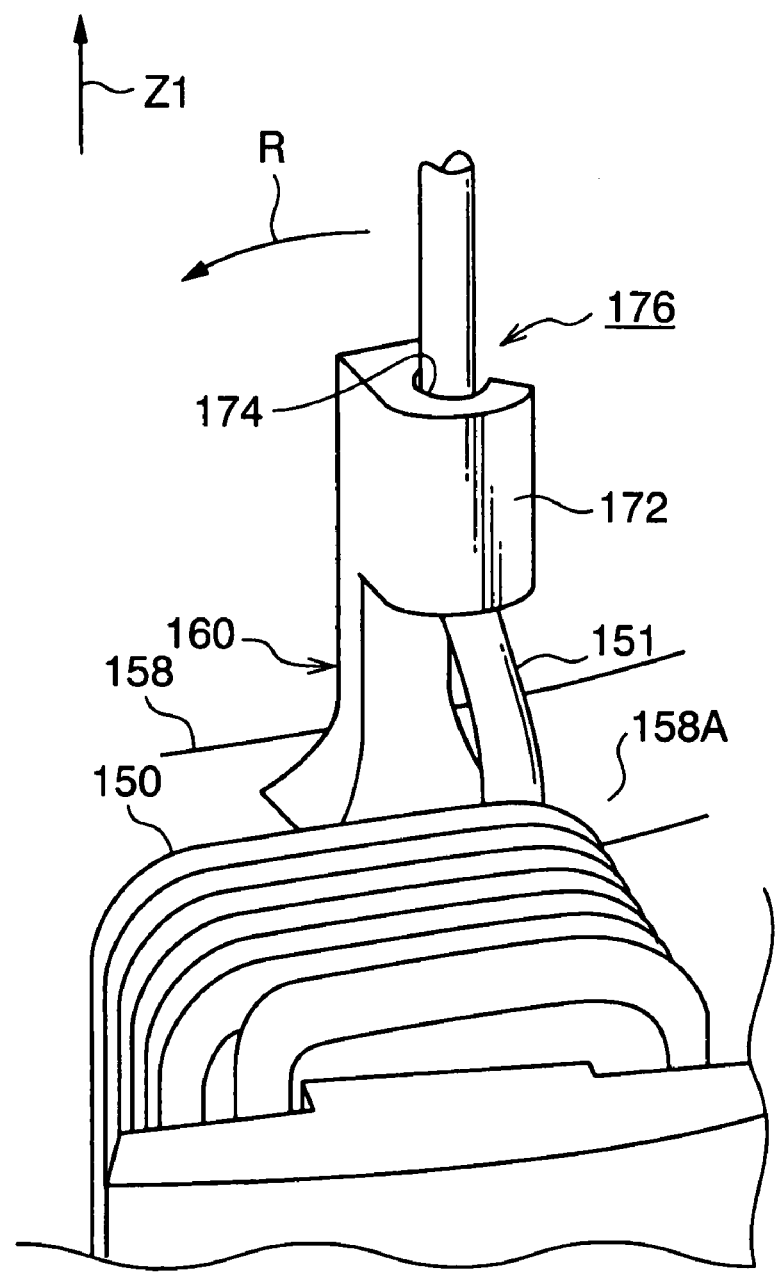
FIG. 21 is a partial enlarged view of the armature shown in FIG. 20.
Figure 22:
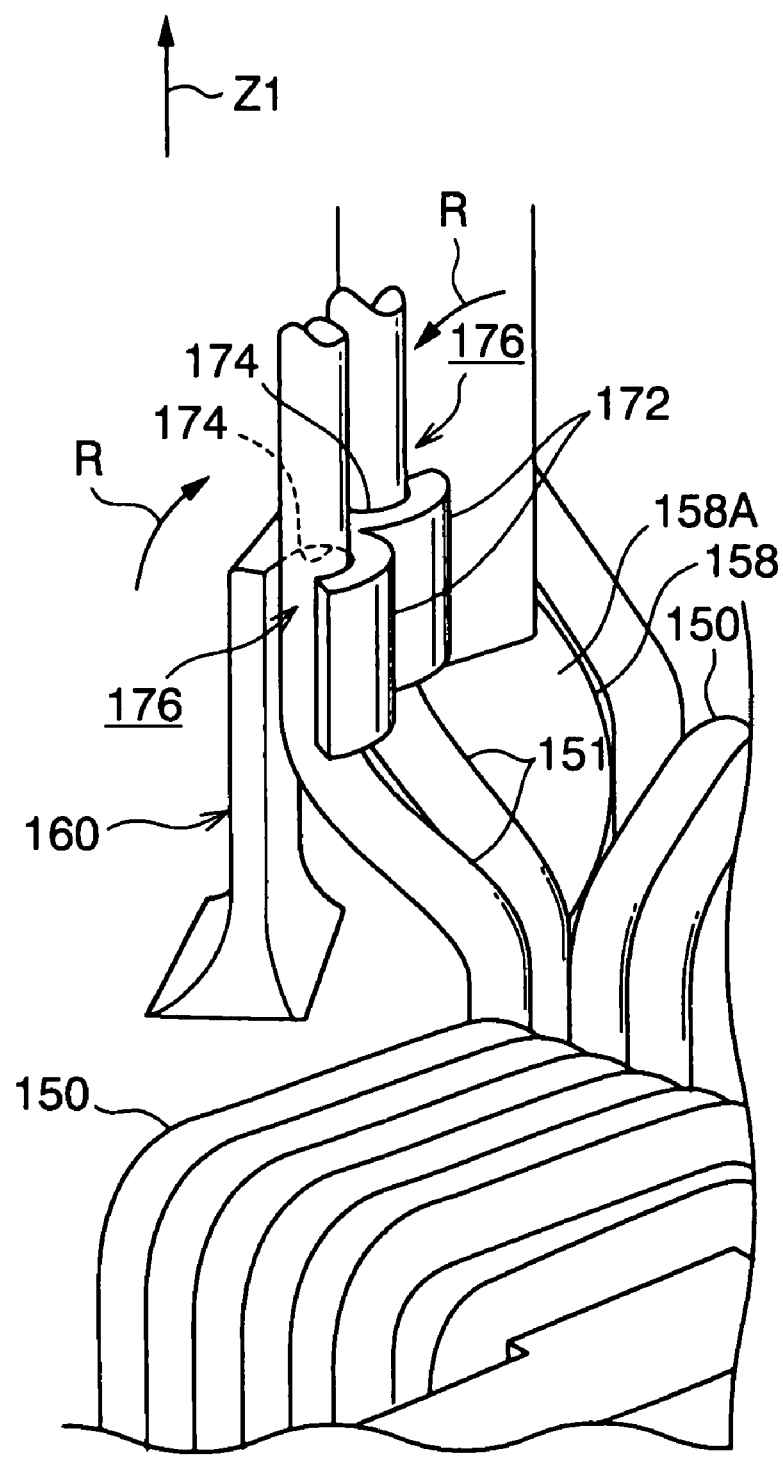
FIG. 22 is another partial enlarged view of the armature shown in FIG. 20.

That is, in the modification shown in FIGS. 20 to 22, each guide 160 has one or two embracing portions (holders) 172, each of which partially embraces (partially circumferentially surrounds) the corresponding winding terminal portion 151. More specifically, the guide 160 of one type shown in FIG. 21 has one embracing portion 172, and the guide of the other type shown in FIG. 22 has two embracing portions 172. In the embracing portion 172, a pressure receiving part 174 is provided at one circumferential side of the embracing portion 172 in a circumferential direction of the armature 118, and an opening 176, through which the corresponding winding terminal portion 151 is passable, is provided at the other circumferential side of the embracing portion 172. The winding terminal portion 151 is placed inside the embracing portion 172 through the opening 176 and is urged against the pressure receiving part 174 by springback, i.e., a reaction force, which is generated by winding the corresponding winding 150 around the tooth portion 154 of the laminated core 144 over the insulators 146, 148.

Therefore, the winding terminal portions 151 are stably positioned in place by the guides 160, so that the winding terminal portions 151 can be appropriately guided to the circuit power supply portions 168.

At the time of connecting the winding terminal portions 151 to the circuit power supply portions 168, each winding terminal portion 151 is partially embraced by the corresponding embracing portion 172 while the winding terminal portion 151 is urged against the pressure receiving part 174 of the embracing portion 172. Thus, the winding terminal portion 151 can be more stably positioned in place by the guide 160.

Furthermore, the opening 176 is placed on the side of the embracing portion 172, which is opposite from a direction of the springback (direction of an arrow R). Thus, it is possible to limit unintentional removal of the winding terminal portion 151, which is placed inside the embracing portion 172, from the embracing portion 172 through the opening 176.

In the second embodiment, the circuit power supply portions 168 are made of the connection terminal plates. Alternatively, the circuit power supply portions 168 may be made by a printed circuit board(s). In such a case, the printed circuit board may serve as a single power supply portion having a plurality of power supply lines connected to winding terminal portions 151. Also, each winding terminal portion 151 may be inserted through a corresponding connection hole of the printed circuit board, and a projected part of the winding terminal portion 151, which projects from the connection hole, may be electrically connected to the periphery of the connection hole in the printed circuit board.

Third Embodiment

A structure of a fan motor 70 according to a third embodiment of the present invention will be described.

FIGS. 23 to 28B show the structure of the fan motor 70 according to the third embodiment of the present invention. The fan motor 70 of the third embodiment of the present invention includes an armature 218 in place of the armature 118 of the fan motor 70 of the second embodiment. Thus, in the third embodiment of the present invention, the armature 218 will be described in detail, and the other parts of the fan motor 70 other than the armature 218 will be indicated by the same reference numerals as those of the second embodiment and will not be described further.

Figure 23:
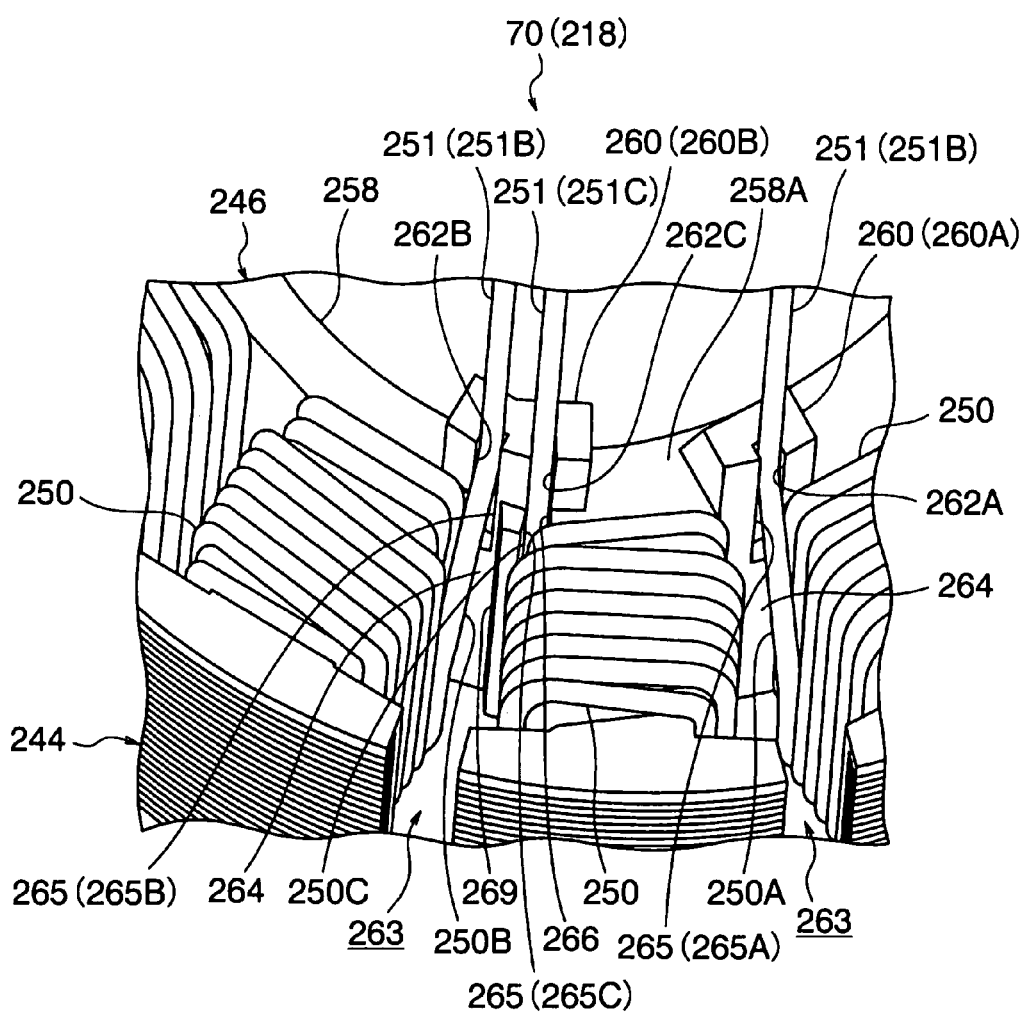
FIG. 23 is a partial perspective view of an armature of a fan motor according to a third embodiment.
Figure 25:
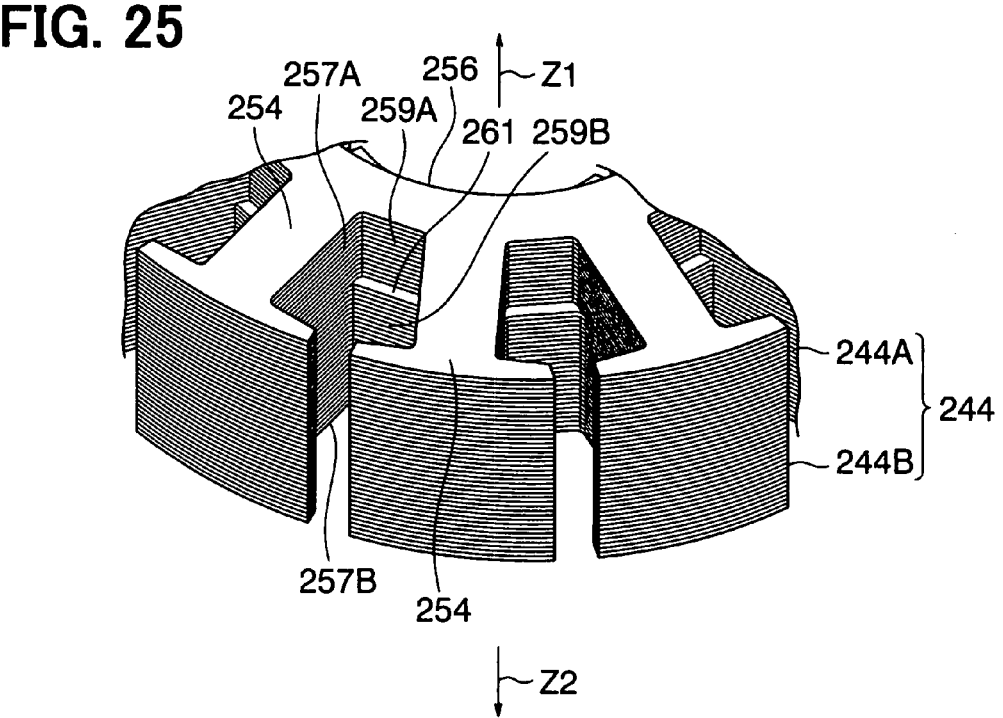
FIG. 25 is a partial perspective view of the armature shown in FIG. 23.

In the fan motor 70 of the third embodiment of the present invention, as shown in FIG. 23, the armature 218 includes a laminated core 244, a plurality (two in this instance) of insulators 246 and a plurality of windings 250. As shown in FIG. 25, the laminated core 244 includes a first core sheet assembly 244A, which is placed on the first axial side (Z1 side), and a second core sheet assembly 244B, which is placed on the second axial side (Z2 side).

Figure 26A:
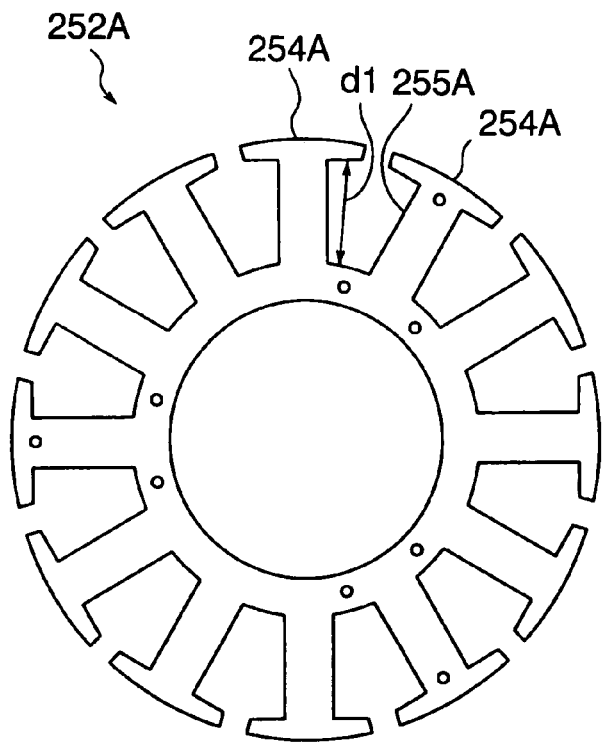
FIG. 26A is a plan view of a first type core sheet of a first core sheet assembly of the laminated core shown in FIG. 25.

The first core sheet assembly 244A is formed by axially stacking a plurality of first type core sheets 252A shown in FIG. 26A. The second core sheet assembly 244B is formed by axially stacking a plurality of second type core sheets 252B shown in FIG. 26B.

Figure 26B:
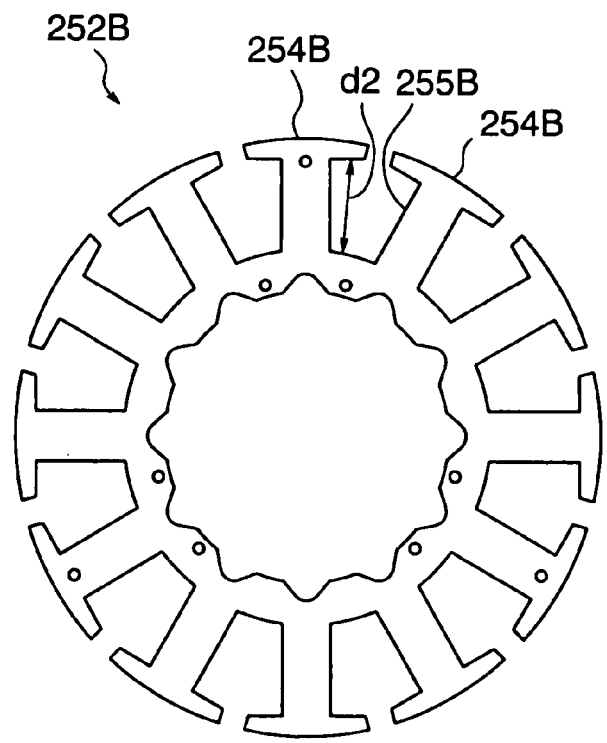
FIG. 26B is a plan view of a second type core sheet of a second core sheet assembly of the laminated core shown in FIG. 25.
Figure 27A:
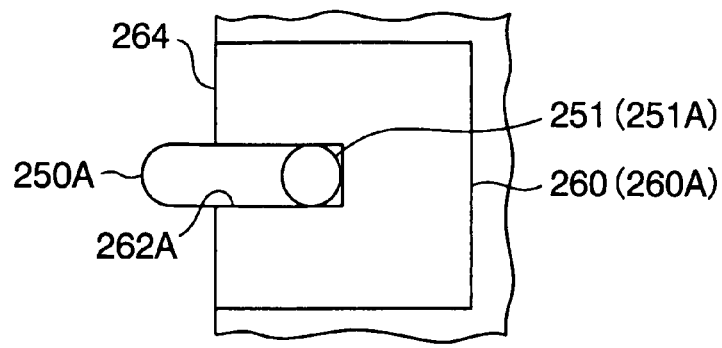
FIG. 27A is a partial plan view of the armature shown in FIG. 23.
Figure 27B:
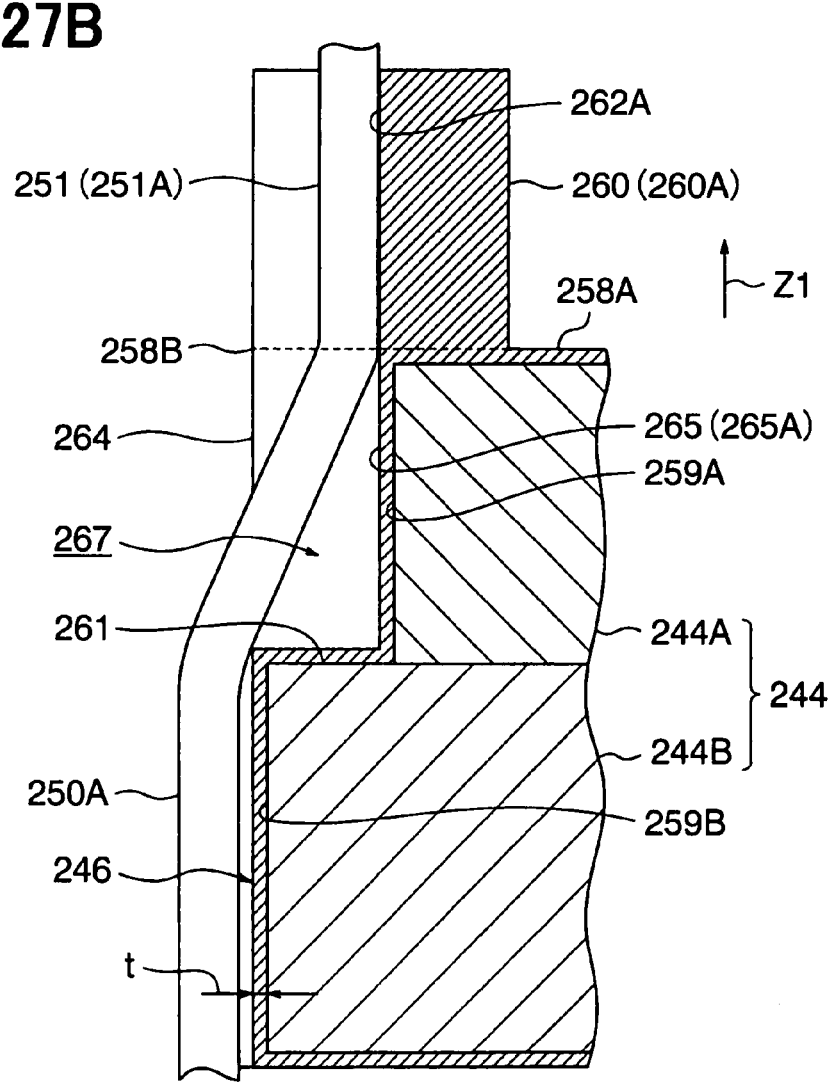
FIG. 27B is a partial cross sectional view of the armature shown in FIG. 23.

As shown in FIG. 26A, the first type core sheet 252A has a plurality of tooth portions 254A, each adjacent two of which circumferentially define a primary core slot 255A therebetween. Also, as shown in FIG. 26B, the second type core sheet 252B has a plurality of tooth portions 254B, each adjacent two of which circumferentially define a secondary core slot 255B therebetween. A radial depth d1 of the primary core slot 255A is set to be larger than a radial depth d2 of the secondary core slot 255B.

A primary core slot 257A of the first core sheet assembly 244A shown in FIG. 25 is formed by axially continuously placing (aligning) the primary core slots 255A of the first type core sheets 252A. Also, a secondary core slot 257B of the second core sheet assembly 244B shown in FIG. 25 is formed by axially continuously placing (aligning) the secondary core slots 255B of the second type core sheets 252B.

A primary core slot bottom wall (peripheral wall that faces radially outward) 259A of each primary core slot 257A is radially inwardly offset from a secondary core slot bottom wall (a radially inner core slot wall) 259B of the axially adjacent secondary core slot 257B. Furthermore, a radially extending step wall 261 is formed between the primary core slot bottom wall 259A and the secondary core slot bottom wall 259B. The step wall 261 faces toward the first axial side (Z1 side) and extends in an imaginary plane that is perpendicular to the central axis of the armature 218.

An axially penetrating through hole 256 is formed in a center part of the laminated core 244, which has the first core sheet assembly 244A and the second core sheet assembly 244B. The tubular portion 126 (see FIG. 14) is received in the through hole 256, so that the armature 218 is entirely supported by the stator housing 112 (see FIG. 14).

Figure 24:
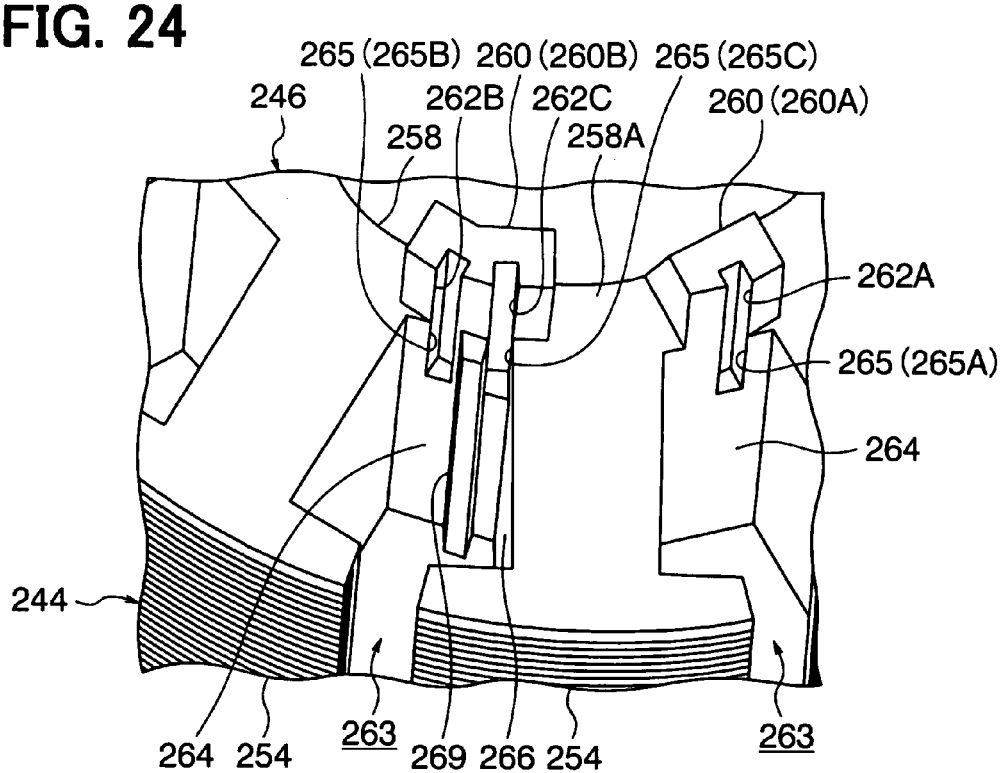
FIG. 24 is a partial perspective view of the armature (without windings) shown in FIG. 23.

The insulators 246 are made of the synthetic resin material and are installed to the laminated core 244. As shown in FIG. 24, a ring portion 258 is formed in the insulator 246 at radially inward of the tooth portions 254 of the laminated core 244. A plurality (eight in this instance) of guides 260 axially projects from an axial end surface 258A of the ring portion 258 on the first axial side.

Winding terminal portions 251 of the windings 250, which are wound around the tooth portions 254 over the insulators 246, are guided to the circuit power supply portions 168 (see FIGS. 14 to 16) by the guides 260, which are arranged one after another along the common imaginary circle about the central axis of the armature 218. Each guide 260 is placed radially inward of the slots 263 of the insulator 246. Furthermore, each guide 260 extends axially, linearly from the ring portion 258 toward the corresponding connection hole 170 (see FIG. 16), which is formed in the corresponding circuit power supply portion 168. The axial height of the respective guides 260 is generally the same.

Furthermore, in the present embodiment, the guides 260 are of two types. Specifically, as shown in FIG. 23, the guide 260 (guide 260A) of one type guides the corresponding winding terminal portion 251 (a winding terminal portion 251A of a winding end portion 250A of the corresponding winding 250). Also, as shown in FIG. 23, the guide 260 (guide 260B) of the other type guides the corresponding two winding terminal portions 251 (a winding terminal portion 251B of a winding end portion 250B of the winding 250 and a winding terminal portion 251C of a winding start portion 250C of the winding 250).

A holder (holder groove) 262A is recessed in the guide 260A, and two holders (holder grooves) 262B, 262C are recessed on the guide 260B. Each holder 262A, 262B, 262C is opened toward a radially outer side of the armature 118 and axially extends. The winding terminal portion 251A of the winding end portion 250A of the winding 250 is press fitted into the holder 262A of the guide 260A. The winding terminal portion 251B of the winding end portion 250B of the winding 250 and the winding terminal portion 251C of the winding start portion 250C of the winding 250 are press fitted into the holders 262B, 262C, respectively, of the guide 260B.

Furthermore, slot bottom walls 264 (the peripheral walls of the armature 218, which face radially outward), each of which defines the corresponding slot 263, are provided in the insulator 246. Each slot bottom wall 264 has one or two relief recesses 265 at one axial end part of the slot bottom wall 264 where the first axial side (Z1 side) of the armature 218 is present.

As shown in FIGS. 27A to 28B, each relief recess 265 opens in the axial end surface 258A of the ring portion 258 and extends in the axial direction of the armature 218. Also, each relief recess 265 is placed in an offset space 267, which is located on the first axial side of the step wall 261. Furthermore, each relief recess 265A extends axially continuously with the holder 262A of the corresponding guide 260A. Also, each relief recess 265B extends axially continuously with the holder 262B of the guide 260B. Furthermore, the relief recess 265C extends axially continuously with the holder 262C of the guide 260C.

The winding terminal portion 251 sides of the axially guided portions of the windings 250 are received in the relief recesses 265A, 265B, 265C, respectively. More specifically, the winding terminal portion 251A side of the winding end portion 250A, the winding terminal portion 251B side of the winding end portion 250B and the winding terminal portion 251C side of the winding start portion 250C are received in the relief recesses 265A, 265B, 265C.

Furthermore, a guide ridge 269 extends in each corresponding slot bottom wall 264, in which the relief recesses 265B, 265C are provided. The winding start portion 250C of the winding 250 is guided (positioned and held) by the guide ridge 269, so that the winding start portion 250C of the winding 250 is guided along a slot lateral wall 266 of the slot 263 (see FIG. 28A).

Next, functions and advantages of the fan motor 70 according to the third embodiment of the present invention will be described.

In the case of the fan motor 70 of the third embodiment of the present invention, as shown in FIGS. 23 and 27A to 28B, at the axial end part of each slot bottom wall 264 where the first axial side (Z1 side) of the armature 218 is located, the one or two relief recesses 265 are provided and are opened in the end surface 258A of the ring portion 258 of the armature 218. The winding terminal portion 251 sides of the axially guided portions (i.e., the winding end portions 250A, the winding end portions 250B and the winding start portions 250C) of the windings 250 are received in the relief recesses 265 of the slots 263.

Thus, the winding terminal portion 251 sides of the axially guided portions of the windings 250 are moderately bent without contacting an edge 258B of the end surface 258A of the ring portion 258. In this way, occurrence of the springback of each winding terminal portion 251 is reduced or limited to limit unintentional removal of the winding terminal portion 251 from the corresponding guide 260. Also, the axial height of each guide 260, which guides the corresponding terminal portion(s) 251, can be reduced or minimized, so that the axial size of the motor can be reduced or minimized.

That is, in a case where each relief recess 265 is eliminated to cause contacting of the winding terminal portion 251 side of the axially guided portion of the winding 250 with the edge 258B of the end surface 258A of the ring portion 258, when the axial height of the guide 260 is reduced, the winding terminal portion 251 side of the axially guided portion of the winding 250 is significantly bent to increase the springback of the winding terminal portion 251. As a result, the holding of the winding terminal portion 251 by the guide 260 becomes difficult. Particularly, in the case of the relatively large motor, such as the fan motor for cooling the radiator of the vehicle, the diameter of each winding 250 is relatively large. Therefore, when the winding 250 is significantly bent, the holding of the winding 250 by the guide 260 becomes difficult. In contrast, when the height of the guide 260 is increased, the winding terminal portion 251 side of the axially guided portion of the winding 250 can have the moderate bent. However, the axial size of the motor is disadvantageously increased.

In contrast to this, in the case of the fan motor 70 of the third embodiment of the present invention, as discussed above, the winding terminal portion 251 sides of the axially guided portions of the windings 250 (i.e., the winding end portions 250A, the winding end portions 250B and the winding start portions 250C) are received in the relief recesses 265, respectively to implement the moderate bents. Thus, the unintentional removable of the winding terminal portions 251 from the guides 260 can be limited. Also, the height of the guides 260 can be reduced or minimized to reduce or minimize the axial size of the motor.

Furthermore, in the case of the fan motor 70 of the third embodiment of the present invention, the laminated core 244 includes the first core sheet assembly 244A at the first axial side of the armature 218 and the second core sheet assembly 244B at the second axial side of the armature 218. The primary core slot bottom wall 259A of the first core sheet assembly 244A is radially inwardly offset from the secondary core slot bottom wall 259B of the second core sheet assembly 244B.

Each relief recess 265 is positioned in the corresponding offset space 267, which is located on the first axial side (Z1 side of the armature 218) of the step wall 261 that is provided between the primary core slot bottom wall 259A and the secondary core slot bottom wall 259B. Thus, the offset space 267 allows easy formation of the relief recess 265.

Furthermore, in the case of the fan motor 70 of the third embodiment of the present invention, the second slot bottom wall 259B is located radially outward (distal end side of the tooth portion 254) of the primary core slot bottom wall 259A. In this way, the thickness (thickness t) of the portion of the slot bottom wall 264, which is placed adjacent to the secondary core slot bottom wall 259B in the radial direction, can be made relatively small to limit an increase in the magnetic loss at this portion.

Furthermore, as shown in FIGS. 23 and 24, in the fan motor 70 of the third embodiment of the present invention, each relief recess 265 extends continuously with the corresponding holder 262 of the corresponding guide 260 in the axial direction of the armature 218. Therefore, the portion of each winding 250, which is received in the corresponding relief recess 265, and the winding terminal portion 251 of the winding 250, which is held by the guide 260, can be guided linearly in the axial direction of the armature 218. Thus, the winding 250 can be easily received in the relief recess 265 and can be easily held by the corresponding guide 260. In this way, the winding operation of the windings 250 can be improved.

Figure 28A:
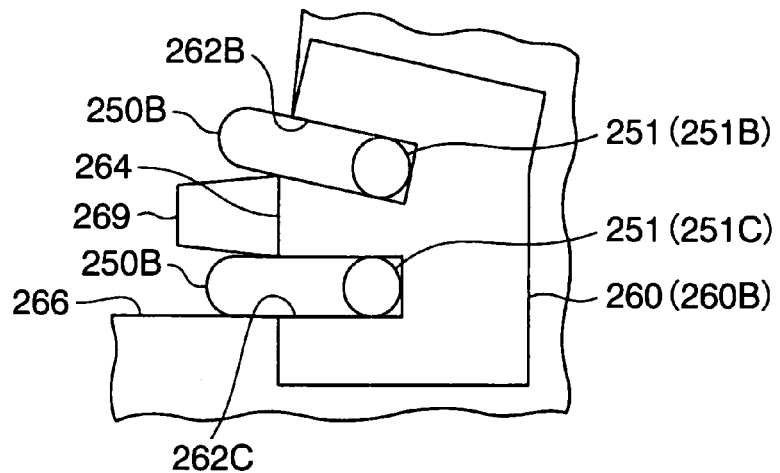
FIG. 28A is a partial plan view of the armature shown in FIG. 23.
Figure 28B:
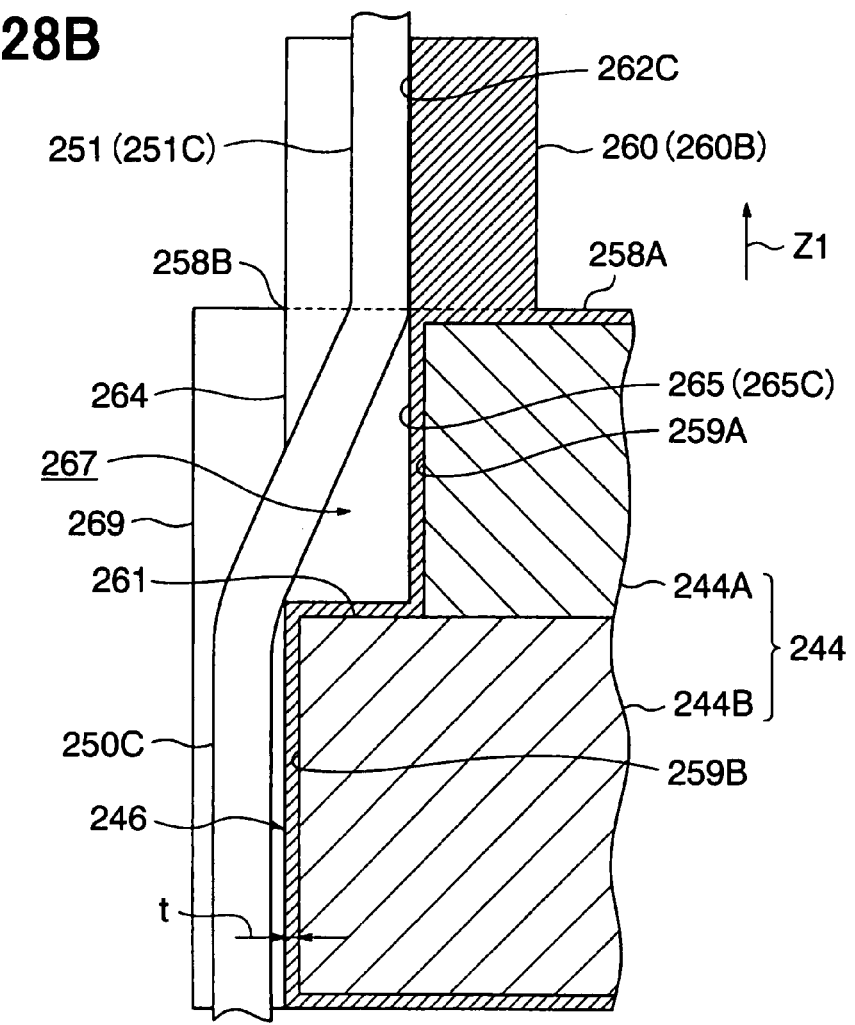
FIG. 28B is a partial cross sectional view of the armature shown in FIG. 23.

Also, in the case of the fan motor 70 of the third embodiment of the present invention, as shown in FIGS. 23 and 28A to 28B, the winding start portion 250C of the winding 250 is guided (positioned and held) by the guide ridge 269, which radially outwardly protrudes from the slot bottom wall 264, so that the winding start portion 250C of the winding 250 is guided along the adjacent slot lateral wall 266. Therefore, it is possible to limit substantial spacing and bulging out of the winding start portion 250C of the winding 250 from the slot lateral wall 266 at the time of winding the winding 250 around the tooth portion 254. In this way, the ratio of occupancy of the winding 250, which is wound around the tooth portion 254, can be improved.

The functions and advantages of the fan motor 70 of the third embodiment of the present invention have been described above. Here, it should be noted that the components of the fan motor 70, which are similar to those of the fan motor 70 of the second embodiment, implement the functions and advantages similar to those of the fan motor 70 of the second embodiment. Therefore, the functions and advantages of these components will not be described further.

Next, a modification of the fan motor 70 of the third embodiment of the present invention will be described.

Figure 29:
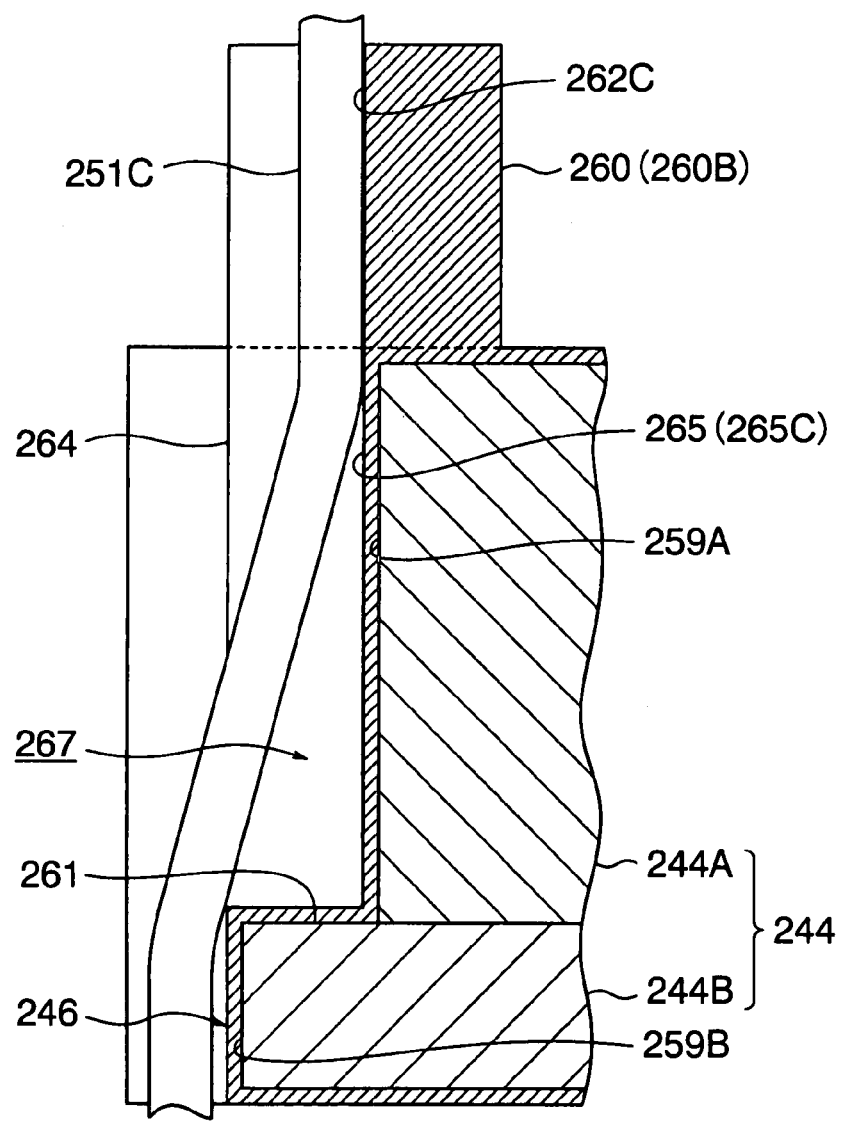
FIG. 29 is a partial cross sectional view of a modification of the armature of the fan motor of the third embodiment.

In the third embodiment, as shown in FIGS. 27A to 28B, less than the axial half of the laminated core 244 is made as the first core sheet assembly 244A. However, as shown in FIG. 29, more than the axial half of the laminated core 244 can be made as the first core sheet assembly 244A. With this construction, the axial size of the relief recess 265 in the axial direction of armature 218 can be made longer, so that the portion of the winding 250, which is received in this relief recess 265, can have more moderate bent.

Furthermore, in the above embodiment, as shown in FIGS. 27A to 28B, the primary core slot bottom wall 259A is offset on the radially inner side of the secondary core slot bottom wall 259B (side opposite from the distal end of the tooth portion 254) to form the offset space 267. The relief recess 265 is placed in the offset space 267. This arrangement may be modified in the following manner.

Figure 30:
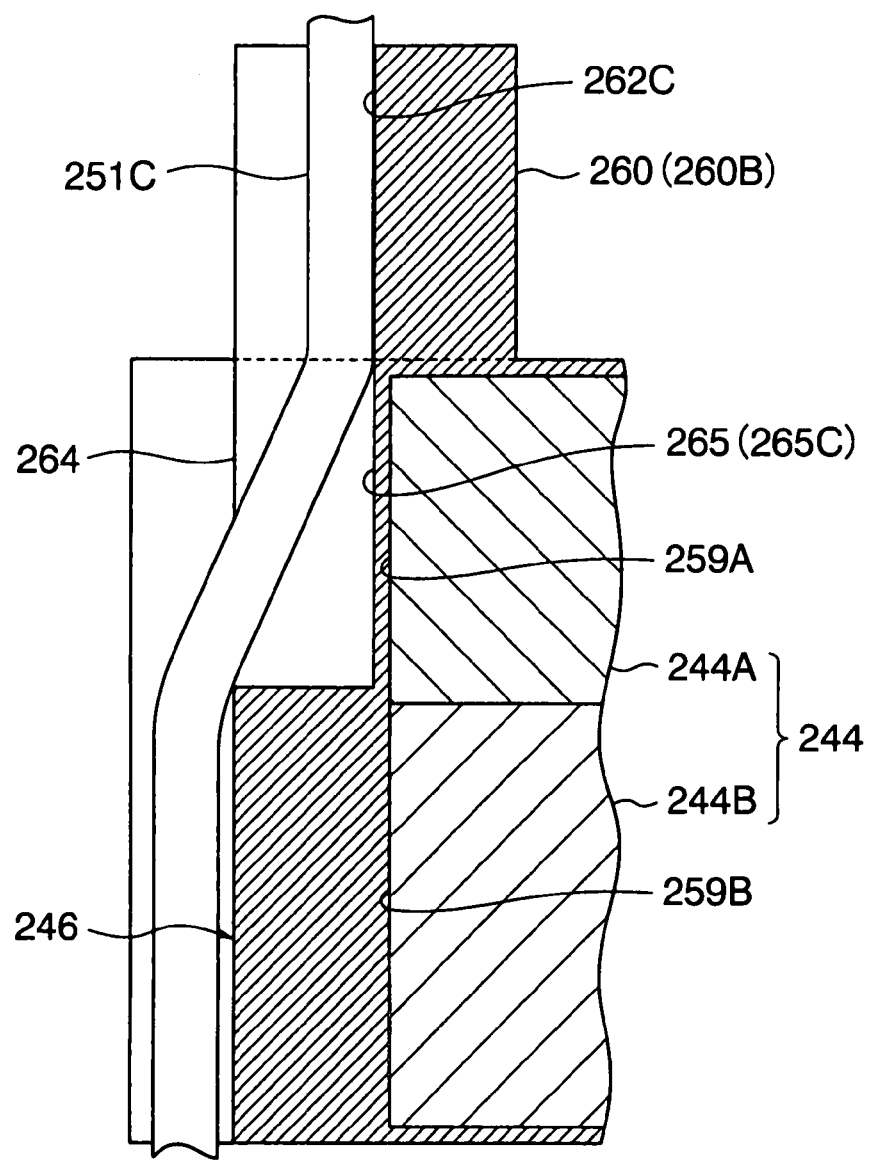
FIG. 30 is a partial cross sectional view of another modification of the armature of the fan motor of the third embodiment.

That is, as shown in FIG. 30, the radially outer end of the primary core slot bottom wall 259A and the radially outer end of the secondary core slot bottom wall 259B may be held at the same position, i.e., may be axially aligned with each other (i.e., the first core sheet assembly 244A and the second core sheet assembly 244B having the same structure), and the relief recess 265 may be made in the slot bottom wall 264 of the insulator 246.

In the third embodiment, the holder 262 of the guide 260 is formed such that the winding terminal portion 251 is press fitted into the holder 262 of the guide 260. Alternatively, similar to the second embodiment, the holder 262 of the guide 260 may be modified to have the snap-fit structure. Furthermore, similar to the modification of the second embodiment, the guide 260 may be formed such that the winding terminal portion 251 is urged against the guide 260 by the springback.

Any one or more components of any one of the above first to third embodiments as well as modifications thereof may be combined with any components of another one of the above first to third embodiments as well as modifications thereof within a scope and sprit of the present invention. For example, guides 160, 260, 260A, 260B of any of the second and third embodiments as well as modifications thereof may be provided in the armature 10 of the first embodiment. Also, the ring portion 20 along with the crossover relief space 28 and the guide wall 44 of the first embodiment or the modifications thereof may be provided to the armature of any of the second and third embodiments as well as modifications thereof.

Additional advantages and modifications will readily occur to those skilled in the art. The invention in its broader terms is therefore not limited to the specific details, representative apparatus, and illustrative examples shown and described.

What is claimed is:

1. An armature comprising:
   a core that includes a ring portion and a plurality of tooth portions, wherein each of the plurality of tooth portions extends radially outward from an outer peripheral part of the ring portion, and a plurality of slots is defined such that each slot is formed between corresponding adjacent two of the plurality of tooth portions; and
   a plurality of windings, each of which is wound around at least two of the plurality of tooth portions to form at least two wound parts of the winding, wherein:
   a crossover of each winding, which connects between corresponding two of the at least two wound parts, is placed on one axial side of the ring portion;
   a crossover relief space is axially recessed in an end surface of the ring portion on the one axial side of the ring portion at a location radially inward of an outer peripheral surface of the ring portion; and
   at least a portion of each crossover is received in the crossover relief space, wherein
   a guide wall axially protrudes in the core on the one axial side of the ring portion such that the guide wall is radially inwardly spaced from an inner peripheral surface of the ring portion to radially define the crossover relief space all around the guide wall between an outer peripheral surface of the guide wall and the inner peripheral surface of the ring portion; and
   each crossover is held along the outer peripheral surface of the guide wall.

2. The armature according to claim 1, wherein an axial position of an outermost part of all the crossovers in an axial direction of the ring portion is the same as or axially inward of an axial position of an outermost part of all the wound parts in the axial direction of the ring portion on the one axial side of the ring portion.

3. The armature according to claim 1, wherein:
   a plurality of radial recesses is formed in an inner peripheral surface of the ring portion to reduce a radial wall thickness of the ring portion at each of the plurality of radial recesses in comparison to a radial wall thickness of the rest of the ring portion; and
   each of the plurality of radial recesses is located radially inward of a corresponding one of the plurality of tooth portions.

4. The armature according to claim 3, wherein:
   a number of the plurality of radial recesses is the same as a number of the plurality of tooth portions; and
   each of the plurality of radial recesses receives the crossover that is connected to the wound part, which is wound around the corresponding one of the plurality of tooth portions.

5. The armature according to claim 1, wherein:
   the guide wall is annular in a circumferential direction of the ring portion;
   an increased diameter portion is provided to the guide wall at a location that is on one side of the respective crossovers where a protruding end of the guide wall is located; and
   an outer diameter of the increased diameter portion is larger than that of an adjacent part of the guide wall, which is adjacent to the increased diameter portion.

6. The armature according to claim 5, wherein:
   the increased diameter portion is formed as a flange member, which is formed separately from the guide wall; and the flange member is held to the guide wall by an engaging means.

7. The armature according to claim 6, wherein the engaging means includes: at least one engaging portion that is formed in the flange member;
at least one engaging portion that is formed in the core to engage with the at least one engaging portion of the flange member.

8. The armature according to claim 1, wherein at least one cooling hole penetrates through a bottom portion of the crossover relief space at the core in the axial direction of the ring portion.

9. A motor comprising:
the armature of claim 1;
a rotor that is rotatably placed radially outward of the armature; and
a fan that is connected to the rotor to rotate integrally with the rotor.

\* \* \* \* \*